(12) United States Patent
Yang et al.

(10) Patent No.: US 10,174,704 B2
(45) Date of Patent: Jan. 8, 2019

(54) SYSTEMS AND METHODS FOR CONTROLLING A FUEL PUMP IN START/STOP AND HYBRID ELECTRIC VEHICLES

(71) Applicant: Ford Global Technologies, LLC, Dearborn, MI (US)

(72) Inventors: Dennis Seung-Man Yang, Canton, MI (US); Kenneth L. Pifher, Holly, MI (US); Jacob Doan, Royal Oak, MI (US); Larry J. Wroza, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 15/331,678

(22) Filed: Oct. 21, 2016

(65) Prior Publication Data
US 2018/0112619 A1    Apr. 26, 2018

(51) Int. Cl.
*F02D 41/30* (2006.01)
*F01N 13/00* (2010.01)
(Continued)

(52) U.S. Cl.
CPC ....... *F02D 41/3082* (2013.01); *F01N 3/0814* (2013.01); *F01N 3/101* (2013.01); *F01N 3/103* (2013.01); *F01N 13/008* (2013.01); *F01N 13/10* (2013.01); *F02D 41/042* (2013.01); *F02D 41/045* (2013.01); *F02D 41/123* (2013.01); *F02D 41/26* (2013.01); *F02M 35/104* (2013.01); *F02M 35/1038* (2013.01); *F02M 35/10386* (2013.01); *F02M 55/025* (2013.01); *F02N 99/00* (2013.01); *B60W 20/10* (2013.01); *B60W 2710/0627* (2013.01);
(Continued)

(58) Field of Classification Search
CPC .... F02D 41/12; F02D 41/123; F02D 41/3082; F02D 41/3836; F02D 33/003; F02D 33/006; F02D 2200/0602
See application file for complete search history.

(56) References Cited

U.S. PATENT DOCUMENTS

| 4,193,380 | A | * | 3/1980 | Marchak | ............... F02D 41/005 123/179.15 |
| 4,577,604 | A | | 3/1986 | Hara et al. | |

(Continued)

*Primary Examiner* — Stephen K Cronin
*Assistant Examiner* — Anthony L Bacon
(74) *Attorney, Agent, or Firm* — David Kelley; McCoy Russell LLP

(57) ABSTRACT

Methods and systems are provided for controlling a vehicle fuel pump at a fuel shut-off event based at least in part on whether combustion stability issues, or potential stall conditions, are indicated in a drive cycle prior to the fuel shut-off event. In one example, a method may include maintaining power to the fuel pump responsive to the potential stall condition being indicated, and independent of an indicated pressure in a fuel rail configured to receive pressurized fuel from the fuel pump, and where the fuel shut-off event includes a deceleration fuel shut-off event or an idle stop event. In this way, fuel may be kept flowing across the fuel pump during fuel shut-off events, responsive to indications of combustion stability issues, such that fuel pump cavitation and other engine and fuel pump-related complications may be avoided.

19 Claims, 6 Drawing Sheets

(51) Int. Cl.
  *F01N 13/10* (2010.01)
  *F02D 41/12* (2006.01)
  *F02D 41/26* (2006.01)
  *F02M 35/10* (2006.01)
  *F02M 35/104* (2006.01)
  *F02M 55/02* (2006.01)
  *F01N 3/08* (2006.01)
  *F01N 3/10* (2006.01)
  *F02D 41/04* (2006.01)
  *F02N 99/00* (2010.01)
  *B60W 20/10* (2016.01)

(52) U.S. Cl.
  CPC  *F01N 2560/025* (2013.01); *F02D 2200/0602* (2013.01); *F02D 2200/1002* (2013.01); *F02D 2200/1012* (2013.01); *F02D 2200/1015* (2013.01); *F02D 2200/701* (2013.01); *F02D 2200/703* (2013.01); *Y10S 903/905* (2013.01)

(56) References Cited

U.S. PATENT DOCUMENTS

| | | |
|---|---|---|
| 5,694,902 A | 12/1997 | Miwa et al. |
| 5,902,346 A | 5/1999 | Cullen et al. |
| 6,885,932 B2 | 4/2005 | Liu et al. |
| 7,869,932 B2 | 1/2011 | Boesch |
| 8,011,902 B2 | 9/2011 | Nagase et al. |
| 8,326,479 B2 | 12/2012 | Martin et al. |
| 8,918,258 B2 | 12/2014 | Hoff et al. |
| 9,328,678 B2 | 5/2016 | Bohr et al. |
| 2007/0149358 A1* | 6/2007 | Doering .............. F02D 41/0087 477/182 |
| 2008/0025849 A1* | 1/2008 | Okamoto ............ F02D 41/3845 417/213 |
| 2008/0314364 A1* | 12/2008 | Okamoto ............ F02D 41/406 123/458 |
| 2011/0232610 A1* | 9/2011 | Okamoto ............ F02D 41/3863 123/495 |
| 2014/0251269 A1* | 9/2014 | Hattar ....................... F02D 1/02 123/357 |

* cited by examiner

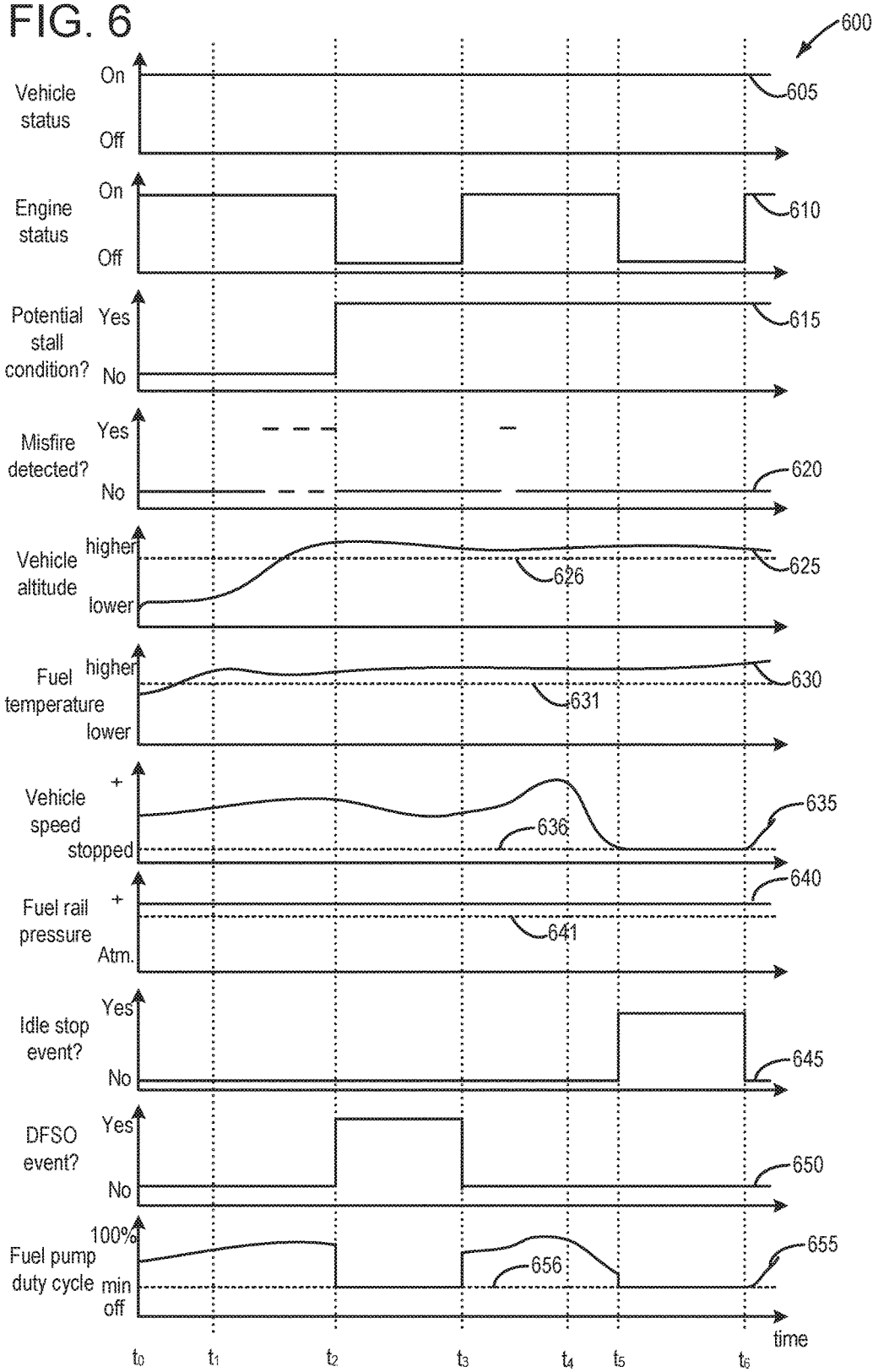

SYSTEMS AND METHODS FOR CONTROLLING A FUEL PUMP IN START/STOP AND HYBRID ELECTRIC VEHICLES

FIELD

The present description relates generally to methods and systems for controlling a vehicle pump during engine-off events responsive to indications of combustion instability.

BACKGROUND/SUMMARY

Start/stop (S/S) vehicles typically deactivate the vehicle engine when the vehicle comes to an idle stop. Such an action is prevalent in city driving, in order to conserve fuel economy. Hybrid electric vehicles (HEVs) are similar to S/S vehicles, and can drive in battery mode for a limited time. In HEVs and S/S vehicles, while the engine is shut off the fuel pump is also typically turned off.

However, some environmental conditions such as high ambient temperature conditions, and rapid changes in elevation, may impact the boiling point of fuel. For example, a common failure of high flow fuel systems is cavitation, or vapor lock, which may result in liquid fuel vaporizing (boiling) inside the fuel pump assembly. If cavitation occurs in a vehicle fuel pump, symptoms may include dramatic loss of fuel flow rate, inconsistent or loss of fuel pressure, ratchet or grinding sounds from the fuel pump, etc. Thus, if the fuel pump is turned off at an idle stop under conditions where fuel temperature is high, and in some examples, where the vehicle has experienced a rapid elevation change to a higher altitude, vehicle performance may be impacted. For example, the pump may be unable to recover fuel pressure in time once cavitation occurs, which may thus result in a potential vehicle stall condition. The inventors herein have recognized these issues.

Furthermore, loss of fuel delivery pressure may result in a lean-out condition that may result in the engine being compromised. In another example, exposure of a vehicle fuel pump to cavitation conditions may in some examples affect the operation of the fuel pump itself. For example, the fuel pump may experience a loss of capacity and efficiency, depending on the severity of the cavitation exposure. The inventors herein have additionally recognized these issues.

U.S. Pat. No. 8,326,479 teaches that in a deceleration fuel shut-off (DFSO) mode, fuel injectors may be turned off, but the fuel pump may remain powered if pressure in the fuel line is below a predetermined threshold. More specifically, a pressure sensor may be used to determine if pressure in the fuel line is at or above a predetermined threshold during the DFSO mode, and if pressure is below the threshold, power to the fuel pump may be maintained. However, the inventors herein have recognized potential issues with such an approach. For example, under circumstances where potential fuel pump cavitation may occur while the engine is off responsive to a DFSO event, it may be desirable to control fuel pump speed to prevent potential fuel pump cavitation, even if pressure in the fuel line is above the predetermined threshold. Furthermore, while U.S. Pat. No. 8,326,479 teaches controlling a fuel pump during DFSO conditions, it is not taught to control the fuel pump during idle stop events, which may represent another condition where fuel pump cavitation may occur while the engine and fuel pump are off. Still further, U.S. Pat. No. 8,326,479 does not teach controlling or regulating the fuel pump during either DFSO events or idle stop events, responsive to potential stall conditions, where potential stall conditions may include one of at least high ambient (and fuel) temperature, and rapid increase in elevation of the vehicle.

The inventors herein have recognized these issues, and have developed systems and methods to at least partially address the above issues. In one example, a method is provided, comprising propelling a vehicle at least in part by an engine that combusts fuel provided to the engine via a fuel pump; controlling fuel injection to one or more engine cylinders via one or more fuel injectors; monitoring the engine for a potential stall condition while the engine is combusting fuel; and controlling the fuel pump at a fuel shut-off event based on whether the potential stall condition is indicated.

In an example, pressure in a fuel rail may be monitored responsive to the fuel shut-off event, where the fuel pump is configured to provide pressurized fuel to the fuel rail prior to the fuel being delivered to the one or more fuel injectors. One example includes stopping the fuel pump responsive to pressure in the fuel rail above a predetermined fuel rail pressure threshold, and further responsive to the potential stall condition not being indicated. Another example includes maintaining power to the fuel pump responsive to pressure in the fuel rail below the predetermined fuel rail pressure threshold, and further responsive to the potential stall condition not being indicated. In such an example, maintaining power to the fuel pump may include controlling a fuel pump speed, wherein the fuel pump speed is controlled as a function of indicated pressure in the fuel rail and wherein the fuel pump is stopped responsive to pressure in the fuel rail reaching the predetermined fuel rail pressure threshold during the fuel shut-off event. Still another example includes maintaining power to the fuel pump responsive to the potential stall condition being indicated, and independent of pressure in the fuel rail. In such an example, maintaining power to the fuel pump may include controlling fuel pump speed to a minimum speed, where the minimum speed comprises a lowest amount of power provided to the pump that maintains fuel flowing across the fuel pump. By controlling fuel pump speed to the minimum speed when a potential stall condition (e.g. combustion instability) is indicated, fuel pump cavitation may be prevented without compromising battery power. By preventing fuel pump cavitation, engine and fuel pump complications may be avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows an example timeline for conducting fuel shut-off events, responsive to whether potential stall conditions are indicated, according to the methods depicted in FIGS. 4-5.

DETAILED DESCRIPTION

The following description relates to systems and methods for controlling an electric vehicle fuel pump responsive to fuel shut off events, such as deceleration fuel shut off (DFSO) events or idle stop events. For example, an idle stop may include at least depression of a brake pedal by a vehicle operator to bring the vehicle to a stop, and a DFSO event may include at least release of an accelerator pedal, and wherein the engine is spun down to rest during the idle stop, but wherein the engine is continued to operate without fueling during the DFSO event. More specifically, responsive to an indication of combustion instability (e.g. potential stall conditions) in a drive cycle just prior to the DFSO event, or the idle stop event, where the drive cycle just prior to the DFSO event or the idle stop event includes a time between a vehicle on event and the DFSO or idle stop event, power to the fuel pump may be maintained to prevent potential fuel pump cavitation. The vehicle may include a vehicle configured to conduct DFSO and idle stop events, such as the vehicle system illustrated in FIG. 1. During a DFSO event, an engine, such as the engine illustrated in FIG. 2, may continue to spin while fuel injection is shut off, while during an idle stop event, the engine may spin down to rest while fuel injection is shut off. At a time of fuel shut off responsive to the DFSO or idle stop event, pressure in a fuel rail, such as the fuel rail depicted in FIG. 3, may be monitored, and responsive to pressure above a predetermined fuel rail pressure threshold and an indicated absence of combustion instability, power to the fuel pump may be shut off. In another example, responsive to an indicated presence of combustion instability, power to the fuel pump may be maintained even if pressure in the fuel rail is indicated to be above the predetermined fuel pressure threshold at the time of fuel shutoff responsive to the DFSO or idle stop event. A method for determining whether combustion instability is indicated, and controlling the fuel pump responsive to combustion instability not being indicated, is illustrated in FIG. 4. Responsive to the indication of combustion instability, a fuel pump may be controlled at either DFSO or idle stop events according to the method depicted in FIG. 5. A timeline illustrating controlling the fuel pump responsive to DFSO or idle stop events, and where controlling the fuel pump comprises differentially controlling the fuel pump depending on the presence or absence of indicated combustion instability prior to the DFSO or idle stop event, is illustrated in FIG. 6.

Figure 1:
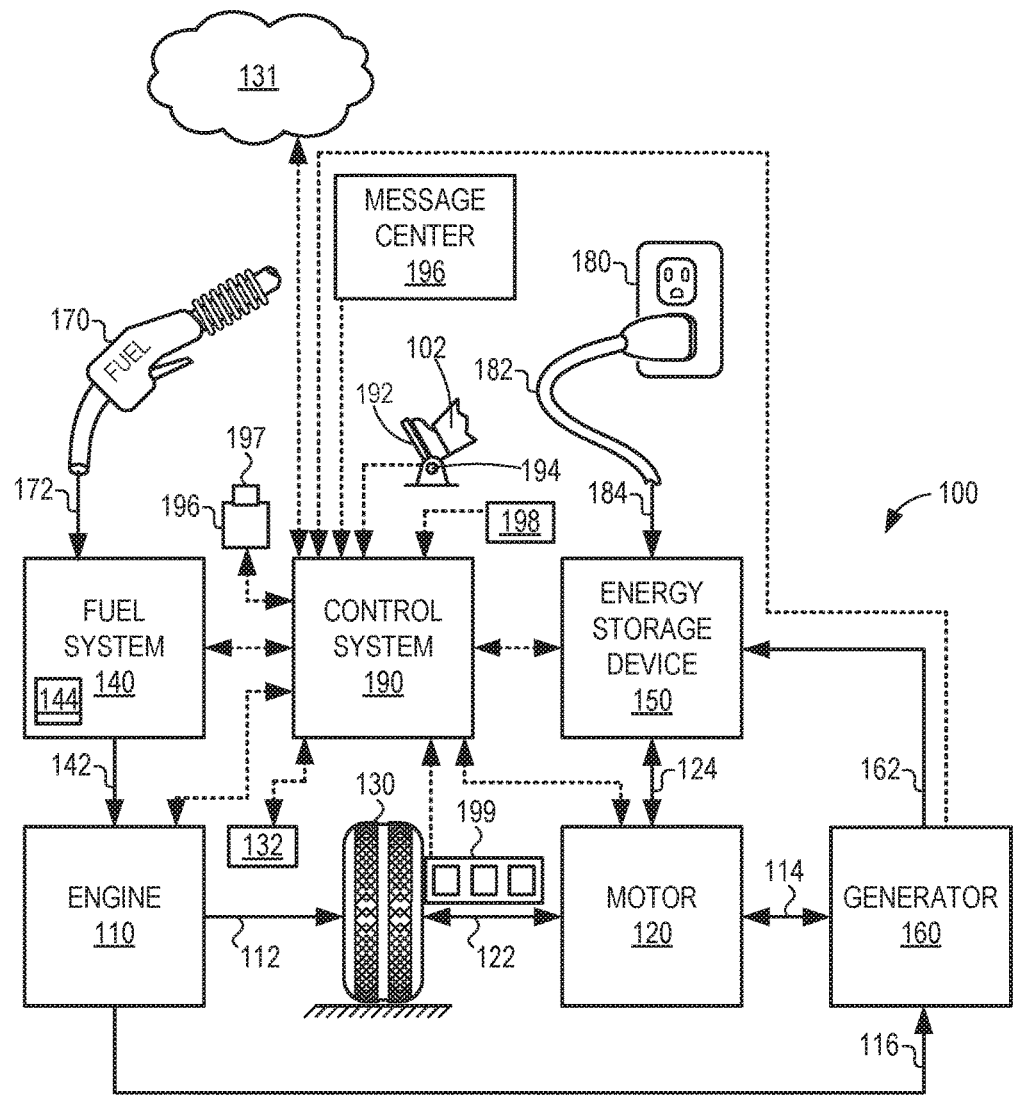
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). While the vehicle propulsion system depicts a HEV, it may be understood that such a vehicle system may also comprise a start/stop (S/S) vehicle.

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed. In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

Figure 2:
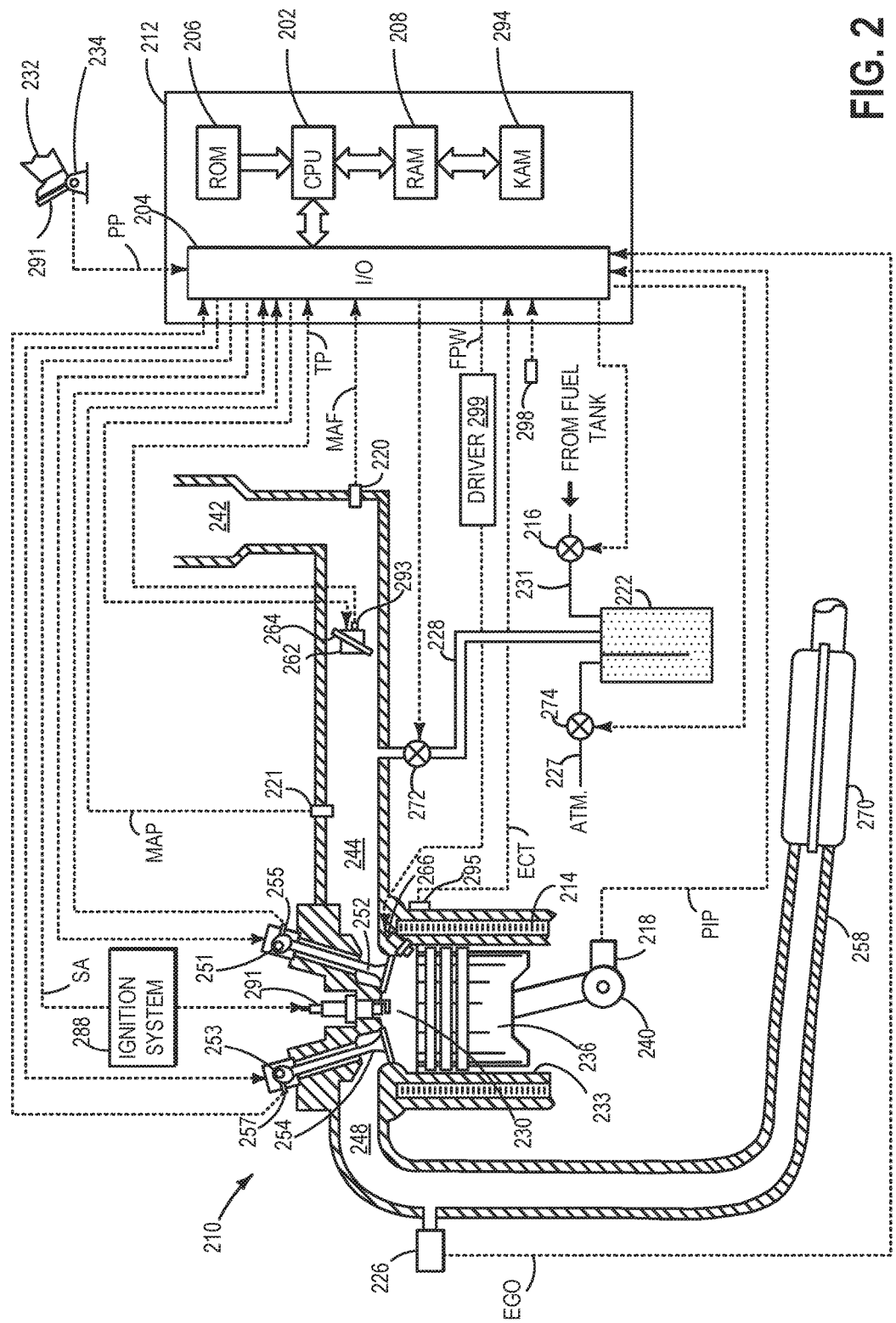
FIG. 2 shows a schematic diagram of an example engine system.

FIG. 2 shows a schematic depiction of an example cylinder 230 in internal combustion engine 210. Cylinder 230 may also be termed combustion chamber 230, herein.

Engine 210 may be controlled at least partially by a control system including controller 212 and by input from a vehicle operator 232 via an input device 292. It may be understood that engine 210 may comprise the same engine as engine 110 depicted in FIG. 1. In this example, input device 292 includes an accelerator pedal and a pedal position sensor 234 for generating a proportional pedal position signal PP.

Combustion chamber 230 of engine 210 may include combustion chamber walls 233 with piston 236 positioned therein. Piston 236 may be coupled to crankshaft 240 so that reciprocating motion of the piston is translated into rotational motion of the crankshaft. Crankshaft 240 may be coupled to at least one drive wheel of a vehicle via an intermediate transmission system (not shown). Further, a starter motor may be coupled to crankshaft 240 via a flywheel (not shown) to enable a starting operation of engine 210.

Combustion chamber 230 may receive intake air from intake manifold 244 via intake passage 242 and may exhaust combustion gases via exhaust manifold 248 and exhaust passage 258. Intake manifold 244 and exhaust manifold 248 can selectively communicate with combustion chamber 230 via respective intake valve 252 and exhaust valve 254. In some embodiments, combustion chamber 230 may include two or more intake valves and/or two or more exhaust valves.

In the example of FIG. 2, intake valve 252 and exhaust valve 254 may be controlled by cam actuation via respective cam actuation systems 251 and 253. Cam actuation systems 251 and 253 may each include one or more cams mounted on one or more camshafts (not shown in FIG. 2) and may utilize one or more of cam profile switching (CPS), variable cam timing (VCT), variable valve timing (VVT) and/or variable valve lift (VVL) systems that may be operated by controller 212 to vary valve operation. The angular position of intake and exhaust camshafts may be determined by position sensors 255 and 257, respectively. In alternate embodiments, intake valve 252 and/or exhaust valve 254 may be controlled by electric valve actuation. For example, cylinder 230 may alternatively include an intake valve controlled via electric valve actuation and an exhaust valve controlled via cam actuation including CPS and/or VCT systems.

Fuel injector 266 is shown coupled directly to combustion chamber 230 for injecting fuel directly therein in proportion to the pulse width of signal FPW received from controller 212 via electronic driver 299. In this manner, fuel injector 266 provides what is known as direct injection of fuel into combustion chamber 230. The fuel injector may be mounted in the side of the combustion chamber or in the top of the combustion chamber, for example. Fuel may be delivered to fuel injector 266 by a fuel system (not shown here, but see FIG. 1 and FIG. 3) including a fuel tank, a fuel pump, and a fuel rail. In some embodiments, combustion chamber 230 may alternatively or additionally include a fuel injector arranged in intake manifold 244 in a configuration that provides what is known as port injection of fuel into the intake port upstream of combustion chamber 230.

Ignition system 288 can provide an ignition spark to combustion chamber 230 via spark plug 291 in response to spark advance signal SA from controller 212, under select operating modes. Though spark ignition components are shown, in some embodiments, combustion chamber 230 or one or more other combustion chambers of engine 210 may be operated in a compression ignition mode, with or without an ignition spark.

Intake manifold 244 is shown communicating with throttle 262 having a throttle plate 264. In this particular example, the position of throttle plate 264 may be varied by controller 212 via a signal provided to an electric motor or actuator (not shown in FIG. 2) included with throttle 262, a configuration that is commonly referred to as electronic throttle control (ETC). Throttle position may be varied by the electric motor via a shaft. Throttle 262 may control airflow from intake passage 242 to intake manifold 244 and combustion chamber 230 (and other engine cylinders). The position of throttle plate 264 may be provided to controller 212 by throttle position signal TP from throttle position sensor 293.

Exhaust gas sensor 226 is shown coupled to exhaust manifold 248 upstream of emission control device 270. Sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 270 is shown arranged along exhaust passage 258 downstream of exhaust gas sensor 226. Device 270 may be a three way catalyst (TWC), NOx trap, various other emission control devices, or combinations thereof.

An exhaust gas recirculation (EGR) system (not shown) may be used to route a desired portion of exhaust gas from exhaust passage 258 to intake manifold 244. Alternatively, a portion of combustion gases may be retained in the combustion chambers, as internal EGR, by controlling the timing of exhaust and intake valves.

Figure 3:
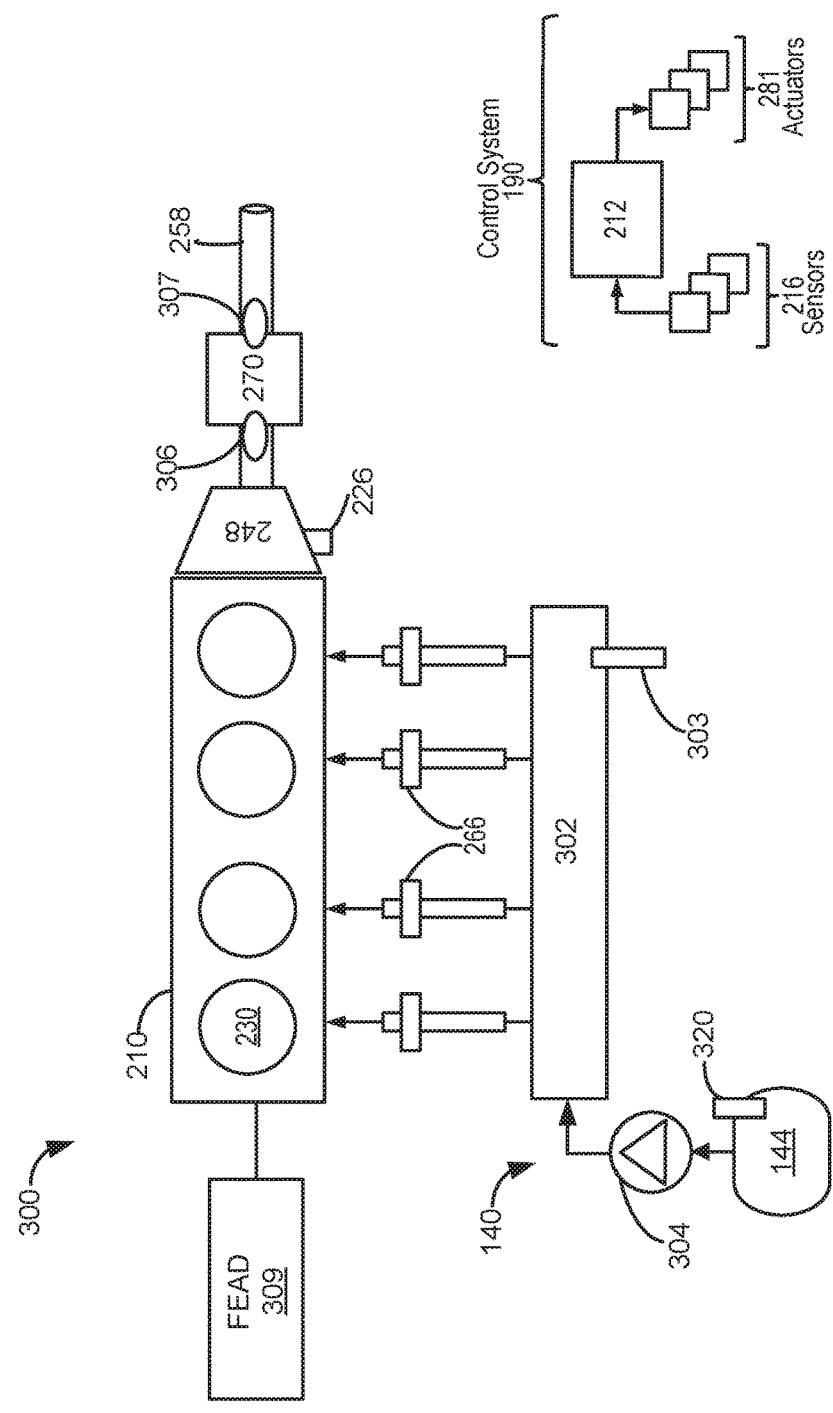
FIG. 3 shows a schematic depiction of a fuel system coupled to an engine system.
Figure 4:
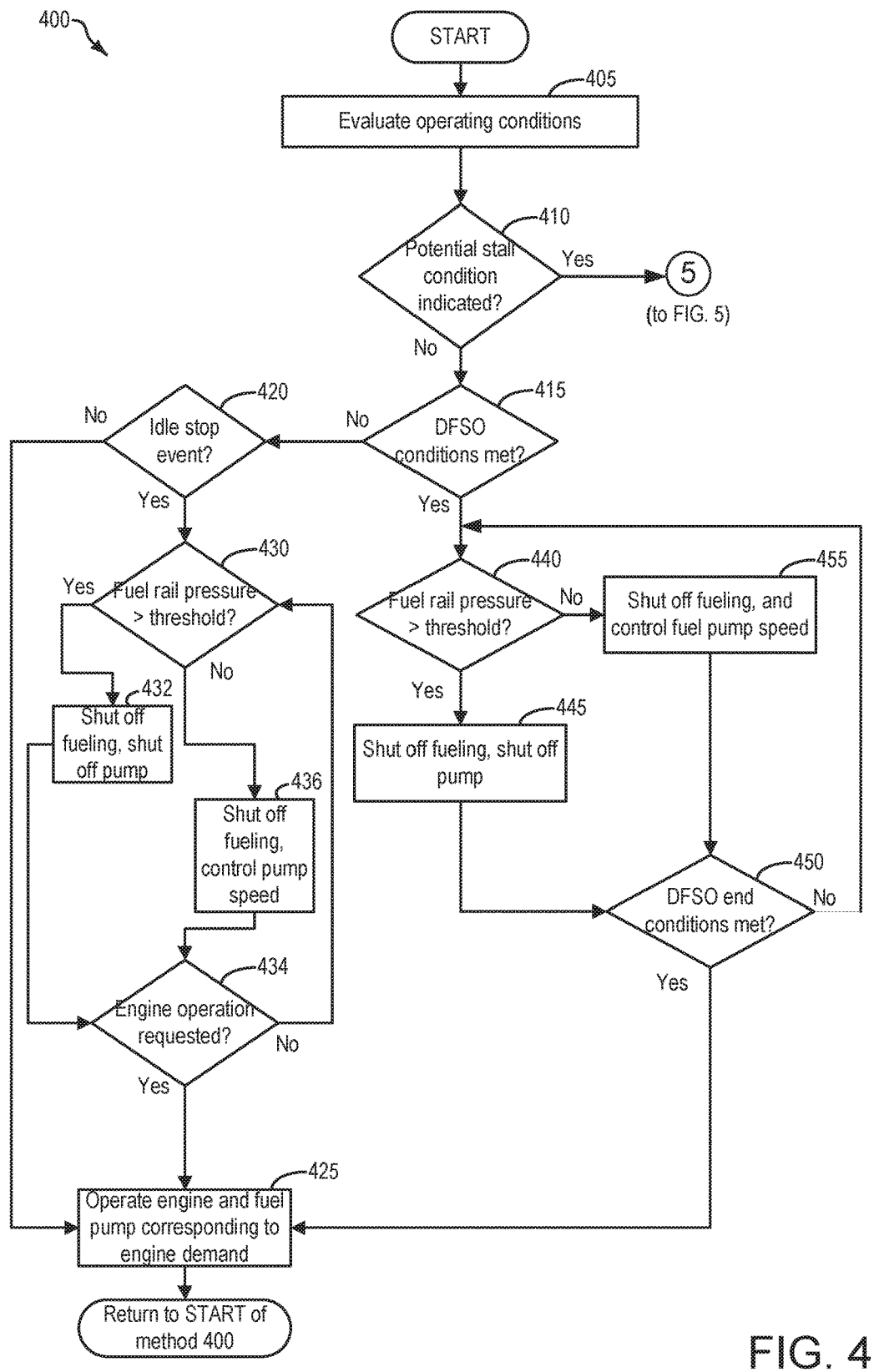
FIG. 4 shows a high level example method for determining whether a potential stall condition is indicated, and controlling a fuel pump during fuel shut-off events responsive to the potential stall condition not being indicated.

An evaporative emissions system may be coupled to each of engine 210 and a fuel system (not shown here, but see FIG. 1 and FIG. 3). Evaporative emissions system includes a fuel vapor container or canister 222 which may be used to capture and store fuel vapors. Vapors generated in the fuel system (e.g. a fuel tank) may be routed to fuel vapor canister 222 via vapor recovery line 231, before being purged to the intake manifold 244. Fuel vapor canister 222 may also be termed fuel system canister or simply, canister 222 herein. Vapor recovery line 231 may include one or more valves 216 for isolating the fuel tank during certain conditions. In one example, valve 216 may be a fuel tank isolation valve (FTIV 216). In another example, valve 216 may be a vapor blocking valve (VBV).

Fuel vapor canister 222 may be filled with an appropriate adsorbent to temporarily trap fuel vapors (including vaporized hydrocarbons). In one example, the adsorbent used is activated charcoal. While a single canister 222 is shown, it will be appreciated that the evaporative emissions system may include any number of canisters.

When purging conditions are met, such as when the canister is saturated, vapors stored in fuel system canister 222 may be purged to intake manifold 244, via purge line 228 by opening canister purge valve 272 (also termed, purge valve 272). Fresh air may be drawn through vent line 227 via canister vent valve 274 into canister 222 to enable desorption of stored fuel vapors. For example, canister vent valve 274 may be a normally open valve, which may be maintained open to draw fresh air into the canister 222 via vent line 227. Canister purge valve 272 may be normally closed but may be opened during certain conditions so that vacuum from engine intake manifold 244 is provided to the fuel vapor canister for purging desorbed fuel vapors.

Flow of air between canister 222 and the atmosphere may be regulated by canister vent valve 274. Fuel tank isolation valve 216 (FTIV 216) may control venting of vapors from fuel tank into the canister 222. FTIV 216 may be positioned between the fuel tank and the fuel vapor canister within conduit 231. FTIV 216 may be a normally closed valve that when opened allows for the venting of fuel vapors from fuel tank to canister 222. Air stripped of fuel vapors may then be vented from canister 222 to atmosphere via canister vent valve 274 and vent line 227. Fuel vapors stored in canister 222 may be purged to intake manifold 244 via canister purge valve 272 at a later time.

The fuel system may be operated in a canister purging mode (e.g., after an emission control device light-off temperature has been attained and with the engine operating), wherein the controller 212 may open canister purge valve 272 and canister vent valve 274 while closing FTIV 216. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a load threshold.

Controller 212 is shown in FIG. 2 as a conventional microcomputer including: microprocessor unit 202, input/output ports 204, read-only memory 206, random access memory 208, keep alive memory 294, and a conventional data bus. Controller 212 commands various actuators such as canister purge valve 272, throttle plate 264, fuel injector 266, and the like. Controller 212 is shown receiving various signals from sensors coupled to engine 210, in addition to those signals previously discussed, including: engine coolant temperature (ECT) from temperature sensor 295 coupled to cooling sleeve 214; a position sensor 234 coupled to an accelerator pedal 296 for sensing accelerator position adjusted by vehicle operator 232; a measurement of intake manifold pressure (MAP) from pressure sensor 221 coupled to intake manifold 244; a profile ignition pickup signal (PIP) from Hall effect sensor 218 (or other type) coupled to crankshaft 240; an ambient temperature sensor 298; a measurement of air mass entering the engine from mass airflow sensor 220; a measurement of throttle position from sensor 293; and air/fuel ratio (AFR) from EGO sensor 226. In a preferred aspect of the present description, crankshaft sensor 218, which may be used as an engine speed sensor, may produce a predetermined number of equally spaced pulses for every revolution of the crankshaft from which engine speed (RPM) can be determined. Such pulses may be relayed to controller 212 as a profile ignition pickup signal (PIP) as mentioned above. Crankshaft sensor 218 may also be utilized to measure crankshaft accelerations (also termed, crank accelerations).

Storage medium read-only memory 206 can be programmed with computer readable data representing instructions executable by processor 206 for performing various routines not specifically listed herein. The controller 212, thus, receives signals from the various sensors of FIG. 2 and employs the various actuators of FIG. 2 to adjust engine operation based on the received signals and instructions stored on a memory of the controller. For example, adjusting canister purge valve 272 may include adjusting an actuator of the canister purge valve. As an example, controller 212 may communicate a signal to the actuator of the canister purge valve, such as a solenoid, to adjust an opening of the canister purge valve.

As described above, FIG. 2 merely shows one cylinder of a multi-cylinder engine, and that each cylinder has its own set of intake/exhaust valves, fuel injectors, spark plugs, etc. In one example, engine 210 may include four cylinders arranged in an inline manner. In another example, engine 210 may include six cylinders arranged in a V-configuration. In yet another example, engine 210 may include eight cylinders arranged in a V-configuration. Alternatively, engine 210 may include additional or fewer cylinders without departing from the scope of this disclosure.

A vehicle system 300 including a fuel system 140 is illustrated in FIG. 3. It may be understood that vehicle system 300 may be the same as vehicle system 100, depicted in FIG. 1. The fuel system 140 delivers fuel to an engine 210 with a plurality of cylinders 230. The fuel system 140 includes a fuel storage tank 144 for storing the fuel on-board the vehicle, and a fuel pump 304 for pumping fuel to a fuel rail 302. The fuel rail 302 also includes a fuel rail pressure sensor 303 for monitoring the fuel rail pressure. The fuel tank 144 also may include a temperature sensor 320 for determining temperature of a fuel stored in the fuel tank.

The fuel rail 302 delivers high pressure fuel to the cylinders 230 through a plurality of direct fuel injectors 266. The embodiment of the fuel system 140 is depicted as a system including solely direct injectors 266. However, this is one example of the fuel system, and other embodiments may include additional components (or may include fewer components) without departing from the scope of this disclosure. For example, the fuel system 144 may additionally or alternatively include port fuel injectors.

The fuel pump 304 pressurizes fuel for delivery through the fuel rail 302. Fuel travels through the fuel rail 302 to at least one fuel injector 266, and ultimately to at least one engine cylinder 230 where fuel is combusted to provide power to the vehicle. In one example, fuel rail pressure may be monitored by a fuel rail pressure sensor 303. The health of individual direct fuel injectors 266 may also be monitored, for example by monitoring fuel rail pressure before and after an injection event, for each fuel injector of the engine, and identifying a degraded fuel injector if the change in rail pressure after the injection event for that injector is greater than expected.

The engine 210 is connected to an engine exhaust passage 258 through an exhaust manifold 248 that routes exhaust gases to the atmosphere. The exhaust passage 258 includes one or more emission control devices 270 mounted in a close coupled position. The emission control devices 270 may include a three-way catalyst (TWC), lean NOx trap, oxidation catalyst, etc. Oxygen sensors 306 and 307 are present at the inlet and outlet of the emission control device 270. An exhaust gas oxygen sensor 226 is shown coupled to the exhaust manifold 248, upstream of the emission control device 270. As discussed above with regard to FIG. 2, sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Likewise, the oxygen sensors 306 and 307 may each be a wideband sensor, narrowband sensor, heated sensor, or other suitable sensor.

The vehicle system 300 further includes a front end accessory drive (FEAD) 309 coupling the engine 210 to one or more loads. Example loads include, but are not limited to, an alternator, air conditioning compressor, water pump, and other suitable loads.

Control system 190 is illustrated in FIG. 3. It may be understood that control system 190 may comprise the same control system as indicated in FIG. 1. As discussed above with regard to FIG. 2, controller 212 may command various actuators 381 such as fuel injectors 266, and fuel pump 304. As an example, controller 212 may send fuel pump 304 the power demanded by engine load while the vehicle is operating. Controller 212 may regulate the amount of power supplied to the pump by rapidly turning the power to the fuel pump on and off (e.g. duty cycling) via square wave pulse width modulation. Thus, a fuel pump rate may be regulated by controlling the duty cycle of the fuel pump. Controller 212 is further shown receiving various signals from sensor coupled to engine 210, in addition to those previously discussed, including fuel rail pressure sensor 303, for example.

For illustrative purposes, fuel pump 304 is depicted external to fuel tank 144. However, it may be understood that fuel pump 304 may in some examples, be positioned inside of fuel tank 144, without departing from the scope of this disclosure.

As discussed above, HEVs and S/S vehicles may be configured to automatically stop and restart the vehicle engine, to reduce the amount of time the engine spends idling, thereby potentially reducing fuel consumption and emissions. For example, in a manual transmission vehicle, the vehicle engine may be automatically stopped responsive to a vehicle operator coming to a stop, pressing a clutch pedal (not shown), moving a gear level to neutral, and releasing the clutch pedal. The engine may then restart responsive to the vehicle operator depressing the clutch prior to selecting a gear to propel the vehicle. Alternatively, in an automatic transmission vehicle, the engine may be shut down responsive to the vehicle operator controlling the vehicle to brake to a full stop. More specifically, the engine shut down may be activated by the brake pedal being in use when the vehicle comes to a halt. In either case, during engine shutdown, the fuel pump (e.g. 304) is typically turned off as well.

Another example where fuel supply to the engine may be stopped during vehicle operation may include a condition referred to as deceleration fuel shut off (DFSO). A DFSO event may include, responsive to a vehicle operator releasing the accelerator pedal, stopping fuel injection to the engine. Stopping of the fuel injection to the engine may be controlled via a controller (e.g. 212), for example, via a signal sent from the controller to actuate the fuel injectors (e.g. 266) to turn off. Fuel injection may then be reactivated responsive to the vehicle operator depressing the accelerator pedal, or responsive to engine rpm dropping below a predetermined speed (e.g. 2000 rpm or less). During DFSO events, the fuel pump (e.g. 304) is typically turned off as well, similar to that discussed above for start/stop events.

However, as discussed above, there may be circumstances where stopping the fuel pump during engine-off conditions while the vehicle is in operation may not be desirable. Specifically, in cases where ambient temperature is high, thus resulting in high fuel temperature, and, in some examples where vehicle altitude has rapidly increased, the boiling point of fuel may be impacted. In such examples, fuel pump cavitation may occur, where fuel pump cavitation refers to fuel boiling inside the fuel pump, if the fuel pump is turned off. Fuel pump cavitation may result in a number of issues, including loss of fuel flow rate, inconsistent or loss of fuel pressure, etc. Thus, if the fuel pump is turned off under conditions were fuel pump cavitation may occur, then upon attempting to restart the engine, potential vehicle stall conditions may result. Accordingly, if conditions are indicated that may result in fuel pump cavitation responsive to fuel pump shutoff during an engine shutdown event (e.g. DFSO event or S/S event), it may be desirable to control (regulate) the fuel pump, such that issues stemming from potential fuel pump cavitation, may be avoided.

Turning now to FIG. 4, a high level example method 400 for determining whether a potential stall condition is indicated for a vehicle, and controlling a fuel pump during conditions where fuel to an engine of the vehicle is stopped depending on whether the stall condition is indicated or not, is shown. More specifically, certain vehicle operating conditions such as high ambient temperature (and correspondingly high fuel temperature), and low barometric pressure, may render the vehicle engine prone to potential stall conditions. In such circumstances, if fueling of the engine is stopped, and if the fuel pump is also stopped, fuel pump cavitation may result, due to boiling of fuel in the fuel pump. By controlling the fuel pump to maintain a low speed during engine-off conditions, fuel pump cavitation may be prevented, and the fuel pump may be prevented from being starved of fuel.

Method 400 will be described with reference to the systems described herein and shown in FIGS. 1-3, though it should be understood that similar methods may be applied to other systems without departing from the scope of this disclosure. Method 400 may be carried out by a controller, such as controller 212 in FIG. 2, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIGS. 1-3. The controller may employ vehicle system actuators, such as fuel injectors (e.g. 266), fuel pump (e.g. 304), etc., according to the method below.

Method 400 begins at 405, and may include evaluating current operating conditions. Operating conditions may be estimated, measured, and/or inferred, and may include one or more vehicle conditions, such as vehicle speed, vehicle location, vehicle altitude, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to step 410, it may be determined as to whether a potential engine stall condition is indicated. As discussed above, certain vehicle operating conditions such as high ambient temperature (and correspondingly high fuel temperature), low barometric pressure for a period of time, or a rapid change from a lower altitude to a higher altitude, may impact a boiling point of fuel. If the boiling point of fuel is substantially lowered, potential stall conditions may result.

As such, determining whether a potential engine stall condition is indicated may include an indication of multiple engine misfire events (e.g. 2, 3, or more misfire events), and loss of engine torque at step 410. For example, an engine controller (e.g. 212) may monitor a misfire history, or count, of one or more engine cylinders. In some examples, a misfire history may include a number of indicated misfires in a particular engine cylinder within a defined duration during selected vehicle operating conditions. As an example, select vehicle operating conditions may include operating conditions wherein it is indicated that fuel temperature is above a predetermined fuel temperature threshold. In another example, select vehicle operating conditions may include operating conditions wherein it is indicated that the vehicle has recently experienced a rapid change in altitude from a lower altitude, to a higher altitude. Said another way, select vehicle operating conditions may include an indication that a rate of change in barometric pressure is greater than a predetermined barometric pressure change rate threshold. In still other examples, select vehicle operating conditions may include an indication that the vehicle has been operating above a predetermined altitude, for a predetermined amount of time. In the above examples, select vehicle operating conditions that include an indication of a rate of barometric pressure change greater than the predetermined barometric pressure change rate threshold, or indication that the vehicle has been operating above a predetermined altitude for a predetermined amount of time, may additionally include an indication that fuel temperature is above the predetermined fuel temperature threshold.

An indication that fuel temperature is above the predetermined fuel temperature threshold may in some examples be indicated by a fuel tank temperature sensor (e.g. 320), positioned in the fuel tank and configured to provide an estimate of fuel temperature to the vehicle controller. In another example, fuel temperature may be inferred as a function of indicated ambient temperature. For example, an ambient temperature sensor (e.g. 298) may be configured to provide an indication of ambient temperature to the vehicle controller, or ambient temperature may be indicated via the onboard navigation system (e.g. GPS), or wirelessly via referencing the internet, etc. In such an example, a lookup table may be stored at the controller, such that responsive to an indication of ambient temperature, an estimate of fuel temperature may be determined. The estimate of fuel temperature may be further based on engine run-time, in some examples. In still other examples, fuel temperature may be inferred by determining total air mass consumed by the engine during a particular drive cycle, where determining total air mass may be carried out via the mass air flow (MAF) sensor (e.g. 220). For example, total air mass consumed by the engine for a particular drive cycle, as indicated by the MAF sensor, may be communicated to the controller. A lookup table stored at the controller may then be utilized to determine an inferred fuel temperature as a function of the total air mass consumed. Such an indication may additionally be based on fuel level in the fuel tank, in some examples. For example, the lower the amount of fuel in the tank, the faster it may be indicated to warm up, and vice versa.

An indication that a rate of barometric pressure change is greater than the predetermined barometric pressure change threshold, or that the vehicle has been operating above a predetermined altitude for a predetermined amount of time, may be indicated via a MAP sensor (e.g. 221), under certain vehicle operating conditions. For example, a MAP sensor may be coupled to the engine intake downstream of the throttle (e.g. 262). During part throttle, or wide open throttle conditions, or when an opening of the throttle is greater than a throttle position threshold, barometric pressure may be accurately determined. In another example, the vehicle onboard navigation system (e.g. GPS) may be utilized to obtain information about local barometric pressure in the vicinity where the vehicle is operating. Still further, in some examples, the vehicle controller may communicate wirelessly, via the internet, for example, to obtain information on barometric pressure in the vicinity of the vehicle. In still other examples, vehicle-to-vehicle (V2V), vehicle-to-infrastructure (V2I) communication, etc., may be utilized to obtain information on local barometric pressure.

As discussed above, potential engine stall conditions may include an indication of multiple engine misfire events, and loss of engine torque at step 410. Furthermore, potential stall conditions may include an indication of deviations in expected air/fuel ratio, as indicated via output of an exhaust gas oxygen sensor (e.g. UEGO sensor). For example, a crankshaft sensor (e.g. 218) may be utilized to monitor crankshaft acceleration. Deviations from expected crankshaft acceleration, where expected crankshaft acceleration may be based on engine load, desired engine speed, etc., may be indicated as misfire events. Further, by monitoring crankshaft acceleration, engine torque may be indicated, and if the indicated engine torque deviates from expected engine torque, where expected engine torque may additionally be a function of engine load, desired engine speed, etc.

Said another way, a system for a vehicle may include, a crankshaft coupled to one or more pistons, a crankshaft sensor, an exhaust gas oxygen sensor positioned in an exhaust manifold of the engine, a mass air flow sensor positioned in an intake manifold of the engine, and a manifold air pressure sensor positioned in the intake manifold. A controller of the vehicle may store instructions in non-transitory memory, that when executed, cause the controller to, prior to commencing the DFSO event or idle stop event, monitor acceleration of the crankshaft via the crankshaft sensor, indicate an exhaust gas air/fuel ratio via the exhaust gas oxygen sensor, indicate barometric pressure via the manifold air pressure sensor, and indicate a fuel temperature of the fuel in the fuel tank as a function of total air mass consumed by the engine during a drive cycle via the mass air flow sensor. Thus, indicating combustion instability may comprise one or more of at least multiple misfire events and loss of engine torque, where misfire events and loss of engine torque are indicated via the crankshaft sensor; a barometric pressure change rate greater than a predetermined barometric pressure change rate threshold, or an indication that the vehicle has been operating above a predetermined altitude for a predetermined amount of time; and a fuel temperature of the fuel provided to the engine above a predetermined fuel temperature threshold.

Thus, if multiple misfire events (e.g. more than 2, or more than 3), loss of engine torque, and deviations to expected air/fuel ratio are indicated at 410, then potential stall conditions may be indicated. In some examples, potential stall conditions may further include an indication that fuel temperature is above the predetermined fuel temperature threshold, and that a rate of change in barometric pressure is greater than the predetermined barometric pressure change threshold. In still other examples, potential stall conditions may additionally or alternatively include an indication that the vehicle has been operating above the predetermined altitude, for the predetermined amount of time.

Figure 5:
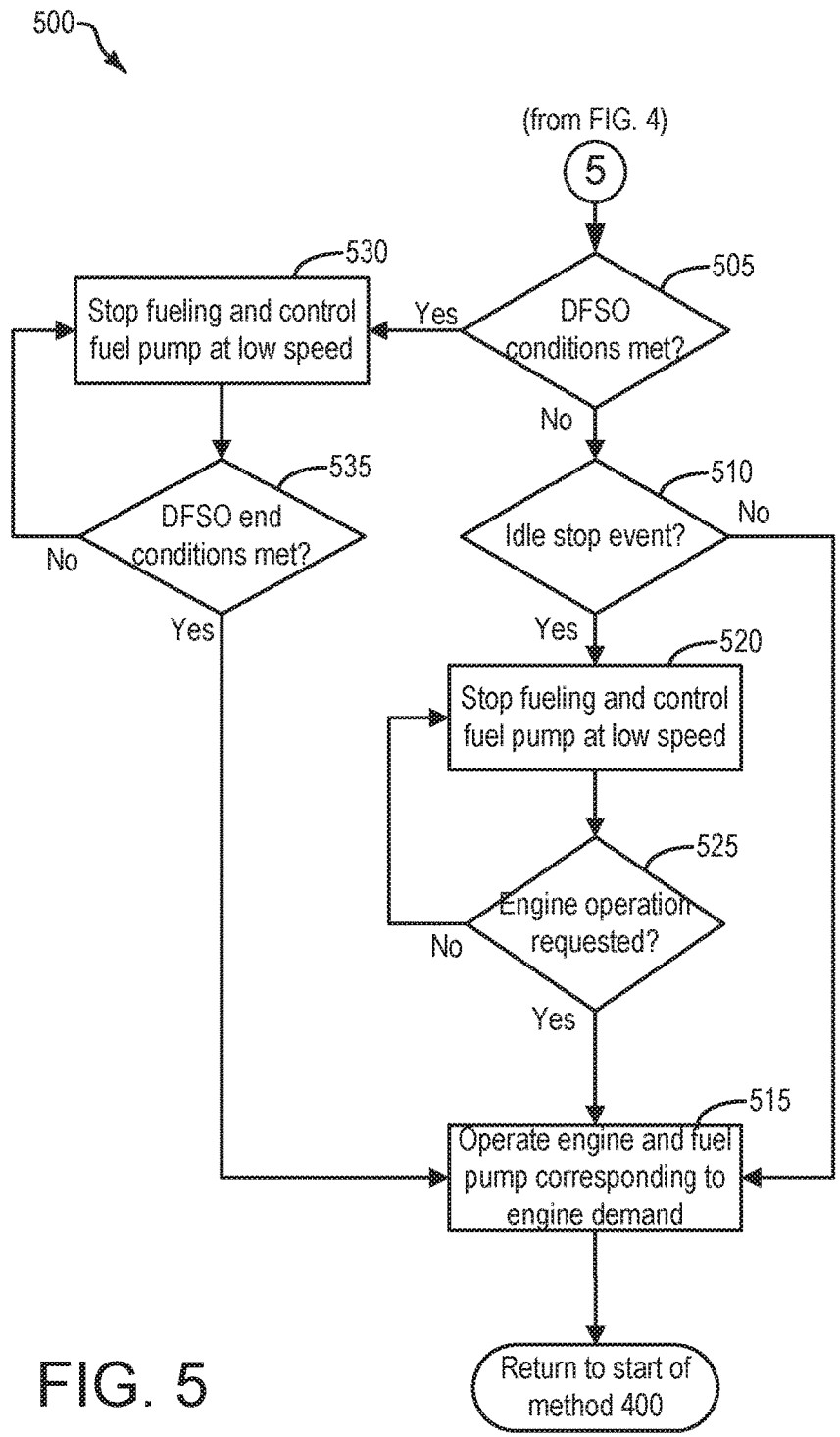
FIG. 5 shows a high level example method that continues from FIG. 4, for controlling a fuel pump during fuel shut-off events responsive to the potential stall condition being indicated.

Thus, if potential stall conditions are indicated at step 410, method 400 may proceed to method 500, depicted at FIG. 5, and may include controlling the vehicle fuel pump at engine-off events based on the indication of potential stall conditions.

Alternatively, if potential stall conditions are not indicated, method 400 may proceed to 415, and may include determining whether conditions for a deceleration fuel shut off event are indicated. DFSO entry conditions may be based on various vehicle and engine operating conditions. In particular, the routine may use a combination of one or more of vehicle speed, vehicle acceleration, engine speed, engine load, throttle position, pedal position, transmission gear position, and various other parameters to determine whether DFSO entry conditions have been met at 204. In one example, the DFSO entry conditions may be based on an engine speed below a threshold. In another example, the DFSO entry conditions may be based on an engine load below a threshold. In still another example, the DFSO condition may be based on an accelerator pedal position.

If, at 415, it is indicated that DFSO conditions are not met, method 400 may proceed to 420. At step 420, method 400 may include indicating whether conditions are met for an idle stop event. More specifically, sensors responsive to engine speed, brake pedal position, and accelerator pedal position may be used to determine idle stop conditions. For example, an idle stop condition may occur when a vehicle brake pedal is depressed by the vehicle operator, when the engine speed is below a threshold, and/or when operator-requested torque is below a threshold.

If, at 420, conditions for an idle stop are not indicated to be met, method 400 may proceed to 425, and may include operating the engine and fuel pump corresponding to vehicle operator requested engine speed, and where operating the engine and fuel pump may be further based on engine load, for example. As an example, power provided to the fuel pump may be proportional to engine demand. Thus, at higher revolutions (e.g. 3000-4000 RPMs), the fuel pump may be provided more power than when the engine is operating at lower revolutions (e.g. 300-400 RPMs). More specifically, a fuel pump duty cycle may be increased responsive to increased engine demand, and decreased responsive to decreased engine demand. Continuing on, method 400 may then return to the start of method 400, such that it may be indicated as to whether potential stall conditions are indicated during the ensuing drive cycle.

Returning to step 420, if conditions for an idle stop event are indicated, method 400 may proceed to step 430. At step 430, method 400 may include indicating whether pressure in the fuel rail is above a predetermined fuel rail pressure threshold. For example, pressure in the fuel rail may be indicated via a fuel rail pressure sensor (e.g. 303), configured to provide an indication of pressure in the fuel rail to the vehicle controller. The predetermined fuel rail pressure threshold may comprise a fuel rail pressure sufficient for starting the vehicle engine at a subsequent engine start-up event, while avoiding engine hesitations and potential stall conditions. If, at 430, fuel rail pressure is indicated to be above the predetermined fuel rail pressure threshold, method 400 may proceed to 432. At step 432, method 400 may include commanding the fuel injectors to stop injection of fuel to the vehicle engine cylinders. As discussed above, the controller may send a signal to the fuel injectors to be commanded to an off state. Furthermore, because pressure in the fuel rail is indicated to be above the predetermined fuel rail pressure threshold, power to the fuel pump may be terminated. For example, as discussed above, a signal from the vehicle controller may command the fuel pump to stop pumping of fuel from the fuel tank to the fuel rail. In such an example, a duty cycle of the fuel pump may be commanded to 0%.

Proceeding to 434, method 400 may include indicating whether engine operation is requested. For example, the vehicle operator may request engine operation by releasing the brake pedal. By releasing the brake pedal, a restart of the engine may be accomplished by providing power to the fuel pump, and commanding the fuel injectors to commence injection of fuel to the engine cylinders. In some examples, restarting the engine may be accomplished by a motor generator rotationally connected to the engine and electrically connected to a battery to serve as a separate restarting motor. With such an arrangement, battery power can be delivered to the engine via the motor generator to assist the engine in accelerating the vehicle into motion. In another example, a starter motor may be coupled to the crankshaft (e.g. 240), via a flywheel, to enable a starting of the vehicle engine.

If, at 434, engine operation is not indicated to be requested, method 400 may return to step 430, and may include continuing to monitor whether fuel rail pressure is above the predetermined fuel rail pressure threshold. Alternatively, if at 434 engine operation is requested, method 400 may proceed to 425, and may include restarting the engine as described above. For example, power to the fuel pump may be provided, and a command from the controller to the fuel injectors may signal the fuel injectors to begin fuel injection to the vehicle engine cylinders. Furthermore, a motor generator serving as a restarting motor may be activated, or a dedicated starter motor may be activated, to enable restarting of the vehicle engine.

Returning to step 430, if fuel rail pressure is indicated to be below the fuel rail pressure threshold, method 400 may proceed to step 436. At step 436, method 400 may include commanding the fuel injectors to stop injection of fuel to the engine cylinders. However, instead of terminating power to the fuel pump, the fuel pump speed may be controlled. For example, fuel pump speed may be controlled such that pressure in the fuel rail rises above the predetermined fuel rail pressure threshold. In some examples, a minimum amount of power may be utilized that may still result in pressure in the fuel rail reaching the predetermined fuel rail pressure threshold. For example, with the fuel pump activated at a minimum speed, or minimum duty cycle, pressure in the fuel rail may be monitored. If pressure in the fuel rail rises, but does not reach the predetermined fuel rail pressure threshold, power to the fuel pump may be increased. For example, the duty cycle of the fuel pump may be increased such that pressure in the fuel rail reaches the fuel rail pressure threshold. As such, controlling the fuel pump speed at step 436 may be carried out responsive to monitored pressure in the fuel rail. By controlling fuel pump speed to a minimum initial speed, battery power may be conserved in such a condition where fuel pump activation is needed to increase pressure in the fuel rail to above the predetermined fuel rail pressure threshold. However, if the minimum initial speed does not result in pressure in the fuel rail reaching the predetermined fuel rail pressure threshold, by controlling the fuel pump to increase fuel pump speed, pressure in the fuel rail may be increased to above the predetermined fuel rail pressure threshold.

Proceeding to 434, method 400 may include indicating whether engine operation is requested, as discussed above. If engine operation is not requested, method 400 may return to step 430, and may include monitoring pressure in the fuel rail. Responsive to pressure in the fuel rail remaining below the predetermined fuel rail pressure threshold, method 400 may proceed to step 436, where fuel pump speed may be continued to be controlled. However, if after activation of the fuel pump and controlling fuel pump speed, pressure in the fuel rail is indicated to be above the fuel rail pressure threshold, method 400 may proceed to step 432, where power to the fuel pump may be terminated (e.g. duty cycle at 0%).

If, at step 434, engine operation is indicated to be requested, method 400 may proceed to step 425, and may include restarting the engine, as discussed above. In a case where the fuel pump was maintained on during the idle stop, the fuel pump may be maintained on during restarting of the engine. Furthermore, the duty cycle of the fuel pump may be controlled responsive to engine demand. Alternatively, if power to the fuel pump was shut off during the idle stop event, method 400 may include restarting the engine and powering the fuel pump, as discussed above. In such an example, the duty cycle of the fuel pump may be controlled responsive to engine demand.

Returning to step 415, if it is indicated that DFSO conditions are met, method 400 may proceed to 440. At 440, method 400 may include indicating whether pressure in the fuel rail is above a predetermined fuel rail pressure threshold. For example, pressure in the fuel rail may be indicated via a fuel rail pressure sensor (e.g. 303), configured to provide an indication of pressure in the fuel rail to the vehicle controller. The predetermined fuel rail pressure threshold may comprise a fuel rail pressure sufficient for starting the vehicle engine at a subsequent engine start-up event, while avoiding engine hesitations and potential stall conditions. If, at 440, fuel rail pressure is indicated to be above the predetermined fuel rail pressure threshold, method 400 may proceed to 445. At step 445, method 400 may include commanding the fuel injectors to stop injection of fuel to the vehicle engine cylinders. As discussed above, the controller may send a signal to the fuel injectors to be commanded to an off state. Furthermore, because pressure in the fuel rail is indicated to be above the predetermined fuel rail pressure threshold, power to the fuel pump may be terminated. For example, as discussed above, a signal from the vehicle controller may command the fuel pump to stop pumping of fuel from the fuel tank to the fuel rail. In such an example, a duty cycle of the fuel pump may be commanded to 0%.

Furthermore, during DFSO, the engine may continue to be operated without fuel injection, such that the engine may continue to rotate and pump air through the engine. By maintaining engine operation without fueling, subsequent restarting of the engine may be accomplished without a starter motor, or a motor generator rotationally coupled to the engine and electrically connected to a battery. As such, after shutting off fuel injection to the vehicle engine and turning off the vehicle fuel pump, method 400 may proceed to 450. At 450, method 400 may include indicating whether DFSO end conditions are met. For example, conditions being met for ending a DFSO event may include a vehicle operator tip-in (e.g. pressing down on the accelerator pedal), or when vehicle speed reaches a threshold speed. If, at 450, DFSO end conditions are not met, method 400 may return to step 440 and may include continuing to monitor fuel rail pressure. If fuel rail pressure has dropped to below the predetermined fuel rail pressure threshold, method 400 may proceed to step 455, and may include controlling power to the fuel pump, as will be discussed in further detail below. Alternatively, if at 450, DFSO end conditions are indicated to be met, method 400 may proceed to 425. At step 425, power to the fuel pump may be provided, and a command from the controller to the fuel injectors may signal the fuel injectors to begin fuel injection to the vehicle engine cylinders. However, because the vehicle was in DFSO mode, where the engine was maintained spinning (e.g. the engine maintained in gear), a starter motor or motor generator may not be utilized to restart the engine. Furthermore, the duty cycle of the fuel pump may be controlled responsive to engine demand. Thus, the duty cycle of the fuel pump may be increased responsive to increased engine demand, and decreased responsive to decreased engine demand.

Returning to step 440, if it is indicated that fuel rail pressure is not above the predetermined fuel rail pressure threshold, method 400 may proceed to 455. At 455, method 400 may include commanding the fuel injectors to stop injection of fuel to the engine cylinders. However, instead of terminating power to the fuel pump, the fuel pump speed may be controlled. For example, fuel pump speed may be controlled such that pressure in the fuel rail rises above the predetermined fuel rail pressure threshold. In some examples, a minimum amount of power may be utilized that may still result in pressure in the fuel rail reaching the predetermined fuel rail pressure threshold. For example, with the fuel pump activated at a minimum speed, or minimum duty cycle, pressure in the fuel rail may be monitored. If pressure in the fuel rail rises, but does not reach the predetermined fuel rail pressure threshold, power to the fuel pump may be increased. For example, the duty cycle of the fuel pump may be increased such that pressure in the fuel rail reaches the fuel rail pressure threshold. As such, controlling the fuel pump speed at step 455 may be carried out responsive to monitored pressure in the fuel rail. By controlling fuel pump speed to a minimum initial speed, battery power may be conserved in such a condition where fuel pump activation is needed to increase pressure in the fuel rail to above the predetermined fuel rail pressure threshold. However, if the minimum initial speed does not result in pressure in the fuel rail reaching the predetermined fuel rail pressure threshold, by controlling the fuel pump to increase fuel pump speed, pressure in the fuel rail may be increased to above the predetermined fuel rail pressure threshold.

Continuing to step 450, method 400 may include indicating whether DFSO end conditions are met. As discussed above, if DFSO end conditions are not met, method 400 may return to step 440, and may include monitoring pressure in the fuel rail. Responsive to pressure in the fuel rail remaining below the predetermined fuel rail pressure threshold, method 400 may proceed to step 455, where fuel pump speed may be continued to be controlled. However, if after activation of the fuel pump and controlling fuel pump speed, pressure in the fuel rail is indicated to be above the fuel rail pressure threshold, method 400 may proceed to step 445, where power to the fuel pump may be terminated (e.g. duty cycle at 0%).

If, at step 450, conditions are met for ending the DFSO event, where, as discussed above, conditions being met may include a vehicle operation tip-in event, or when vehicle speed reaches a threshold speed, method 400 may proceed to step 425. At 425, method 400 may include providing power to the fuel pump, and commanding the fuel injectors to begin fuel injection to the vehicle engine cylinders. As discussed above, because the vehicle was in DFSO with the engine maintained spinning, a starter motor or motor generator may not be utilized to restart the engine. Furthermore, the duty cycle of the fuel pump may be controlled responsive to engine demand, as discussed above.

The above description pertains to vehicle operating conditions where a potential stall condition has not been indicated, as discussed above with regard to step 410 of method 400. However, if a potential stall condition is indicated, method 400 may proceed to method 500 depicted at FIG. 5, and may include controlling the fuel pump during idle stop and DFSO events. In this way, fuel pump cavitation may be avoided, and potential stall conditions at engine start-up after a fuel shut-off event may be avoided.

Turning now to FIG. 5, a high level example method 500 for controlling a vehicle fuel pump responsive to idle stop or deceleration fuel shut off (DFSO) events, and further responsive to an indication of a potential stall condition, is shown. More specifically, method 500 may continue from method 400, and may include maintaining the vehicle fuel pump on at a low speed responsive to an indication of an fuel shut-off event, under conditions where it is indicated that fuel pump cavitation may result if power to the fuel pump is stopped, or terminated.

Method 500 will be described with reference to the systems described herein and shown in FIGS. 1-3, though it should be understood that similar methods may be applied to other systems without departing from the scope of this disclosure. Method 500 may be carried out by a controller, such as controller 212 in FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1-3. The controller may employ vehicle system actuators, such as fuel injectors (e.g. 266), fuel pump (e.g. 304), etc., according to the method below.

As discussed, method 500 continues from method 400, and begins at step 505. At 505, method 500 may include indicating whether DFSO conditions are indicated to be met. As discussed above, DFSO entry conditions may be based on various vehicle and engine operating conditions, such as a combination of one or more of vehicle speed, vehicle acceleration, engine speed, engine load, throttle position, pedal position, transmission gear position, etc. In some examples, DFSO entry conditions may be based on one or more of engine speed below a threshold, and engine load below a threshold. In some examples, accelerator pedal position may be utilized as a basis or whether DFSO conditions are met.

If, at step 505, DFSO conditions are not indicated to be met, method 500 may proceed to 510. At 510, method 500 may include indicating whether conditions are met for an idle stop event. As discussed above, sensors responsive to engine speed, brake pedal position, and accelerator pedal position may be used to determine whether idle stop conditions are met. Idle stop conditions may occur when a vehicle brake pedal is depressed by the vehicle operator, when engine speed is below a threshold, and/or when operator-requested torque is below a threshold.

If, at 510, conditions for an idle stop are not indicated to be met, method 500 may proceed to 515, and may include operating the engine and fuel pump corresponding to vehicle operator requested engine speed, and where operating the engine and fuel pump may be further based on engine load, for example. More specifically, a fuel pump duty cycle may be increased responsive to increased engine demand, and decreased responsive to decreased engine demand. Continuing on, method 500 may then return to the start of method 400, such that it may be indicated as to whether potential stall conditions are still indicated, and if so, whether DFSO or idle stop events are indicated during the ensuing drive cycle.

Returning to step 510, if conditions are indicated to be met for an idle stop, method 500 may proceed to step 520. At 520, method 500 may include stopping fueling the engine. For example, the vehicle controller may send a signal to the fuel injectors (e.g. 266), commanding the fuel injectors to stop injection of fuel to the engine cylinders. However, instead of cutting off power to the fuel pump, as described with regard to step 430 of method 400, power to the fuel pump may be maintained (e.g. controlled) at step 520. More specifically, because potential vehicle stall conditions were indicated, if power to the fuel pump were to be cut off completely, fuel pump cavitation may result. In other words, if the duty cycle of the fuel pump were to be commanded to 0%, fuel pump cavitation may result, due to the boiling point of fuel being impacted by the potential stall conditions. As discussed, potential stall conditions may include fuel temperature above a fuel temperature threshold, barometric pressure change greater than a predetermined barometric pressure change threshold, or an indication that the vehicle has been operating above a predetermined altitude (e.g. barometric pressure below a predetermined barometric pressure threshold), for a predetermined amount of time, and where multiple misfire events, loss of engine torque, and deviations to expected air/fuel ratio, are indicated.

Thus, at step 520, power to the fuel pump may be maintained. More specifically, power to the fuel pump may be maintained at a low, or minimum, setting. In other words, a duty cycle of the fuel pump may be commanded to a minimum setting that may still enable fuel to flow across the fuel pump such that the fuel pump is not starved for fuel. By commanding the fuel pump to a minimum setting, battery power may be conserved, as opposed to maintaining the fuel pump on at a higher duty cycle. Thus, by maintaining the fuel pump on at the minimum setting, fuel pump cavitation may be prevented, and battery power may be conserved. It may be understood that, unlike circumstances where potential stall conditions are not indicated (see FIG. 4), where the fuel pump may be controlled responsive to whether pressure in the fuel rail is indicated to be above, or below, a predetermined fuel rail pressure threshold, at step 520, the fuel pump may be maintained on at a minimum setting regardless of pressure indicated in the fuel rail.

Continuing to step 525, method 500 may include indicating whether engine operation is requested. As discussed above, a vehicle operator may request engine operation by releasing the brake pedal. Upon releasing the brake pedal, a restart of the engine may be accomplished by commanding fuel injectors to commence injection of fuel to the engine cylinders. Furthermore, a motor generator rotationally connected to the engine and electrically connected to a battery may serve as a starting motor, or a dedicated starter motor may be utilized to enable a starting of the vehicle engine. Still further, because the fuel pump was operated at a minimum setting (e.g. minimum voltage) during the idle stop, the fuel pump may be maintained on responsive to engine operation being requested.

If, at 525, engine operation is not indicated to be requested, method 500 may return to step 520, and may include continuing to maintain the engine in an off state, with the fuel injectors commanded off via the controller, but where the fuel pump is maintained on at a minimum setting. Alternatively, if at 525 engine operation is requested, method 500 may proceed to 515, and may include restarting the engine as discussed. For example, a command from the controller to the fuel injectors may signal the fuel injectors to begin fuel injection to the vehicle engine cylinders, and a motor generator serving as a restarting motor may be activated, or a dedicated starter motor may be activated, to enable restarting of the vehicle engine. Furthermore, the fuel pump may be maintained on initially at the minimum setting, such that fuel flow is maintained across the fuel pump. However, as engine demand as dictated by the vehicle operator increases, power to the fuel pump may be increased accordingly. In other words, the duty cycle of the fuel pump may be increased responsive to increased engine demand. Subsequent to conducting the idle stop event and restarting the engine, method 500 may return to the start of method 400, such that it may be indicated as to whether potential stall conditions are present, and if so, whether DFSO or idle stop events are indicated during the ensuing drive cycle.

Returning to step 505, if DFSO conditions are indicated to be met, method 500 may proceed to step 530. At step 530, method 500 may include the controller commanding the fuel injectors to stop injection of fuel to the engine cylinders. However, unlike circumstances where potential stall conditions are not indicated (see FIG. 4), where the fuel pump may be controlled responsive to whether pressure in the fuel rail is indicated to be above, or below, a predetermined fuel rail pressure threshold, at step 530, the fuel pump may be maintained on at a minimum setting regardless of pressure indicated in the fuel rail. In other words, whether pressure in the fuel rail is above or below the predetermined pressure threshold, power to the fuel pump may be maintained at a minimum setting. As discussed above, the minimum setting may comprise a fuel pump duty cycle that may enable fuel to flow across the fuel pump such that the fuel pump is not starved for fuel, but where battery power is not used excessively. By maintaining a flow of fuel across the fuel pump, fuel pump cavitation may be prevented responsive to the indication of potential stall conditions. Furthermore, potential stall conditions at engine start-up after the fuel shut-off event may be avoided.

As discussed above, during the DFSO event, the engine may continue to be operated without fuel injection, such that the engine may continue to rotate and pump air through the engine, such that subsequent restarting of the engine may be accomplished without a starter motor, or a motor generator rotationally coupled to the engine and electrically connected to a battery.

Continuing to 535, it may be indicated as to whether conditions are met for ending the DFSO event. As discussed, conditions being met for ending a DFSO event may include a vehicle operator tip-in event, or when vehicle speed reaches a threshold speed. If, at 535, DFSO end conditions are not met, method 500 may return to step 530, and may include continuing to maintain fuel injection stopped, and continuing to maintain fuel flow across the fuel pump, where fuel flow may be maintained by operating the fuel pump at a minimum speed (e.g. minimum duty cycle) for the duration of the DFSO event.

Alternatively, if at 535, DFSO end conditions are indicated to be met, method 500 may proceed to 515. At step 515, a command from the controller to the fuel injectors may signal the fuel injectors to being fuel injection to the vehicle engine cylinders. Because the engine was maintained spinning, a starter motor or motor generator may not be utilized to restart the engine. Furthermore, power to the fuel pump may be maintained, initially at the minimum setting, but which may be increased responsive to increased engine demand. In other words, the duty cycle of the fuel pump may be increased responsive to increased engine demand, and decreased responsive to decreased engine demand. Continuing on, method 500 may then return to the start of method 400, such that it may be indicated as to whether potential stall conditions are still indicated, and if so, whether DFSO or idle stop events are indicated during the ensuing drive cycle.

Thus, the methods of FIG. 4 and FIG. 5 may enable controlling a fuel pump responsive to a presence or absence of combustion instability, or potential vehicle stall conditions. One example may include responsive to a deceleration fuel shut off (DFSO) event, while the engine continues to spin without fuel injection to the one or more cylinders, maintaining power to the fuel pump responsive to fuel rail pressure below a fuel rail pressure threshold at a time when fuel injection is stopped; and responsive to an engine idle stop, where the engine spins down to rest, maintain power to the fuel pump responsive to an indication of combustion instability before the idle stop, even if fuel rail pressure is above the fuel rail pressure threshold. In such an example, an absence of combustion instability in a drive cycle before the DFSO event may be indicated, where the indicated absence of combustion instability and the DFSO event occur in the same drive cycle. A fuel pump duty cycle may be controlled during the DFSO event to increase pressure in the fuel rail to above the predetermined fuel rail pressure threshold while fuel injection is stopped, and wherein responsive to an indication that the pressure in the fuel rail is above the predetermined fuel rail pressure threshold, power supply to the fuel pump may be stopped. Alternatively, responsive to the engine idle stop, a fuel pump speed may be controlled to a minimum speed, where the minimum speed may comprise a lowest amount of power provided to the fuel pump that maintains fuel flowing across the fuel pump.

In another example, power may be maintained to the fuel pump responsive to the DFSO event and combustion instability being indicated prior to the DFSO event, if pressure in the fuel rail is above or below the predetermined fuel rail pressure threshold. Still another example may include maintaining power to the fuel pump responsive to the idle stop event and combustion instability not being indicated, and responsive to pressure in the fuel rail below the predetermined fuel rail pressure threshold, but not responsive to pressure in the fuel rail above the predetermined fuel rail pressure threshold.

Said another way, the methods of FIG. 4 and FIG. 5 may include propelling a vehicle at least in part by an engine that combusts fuel, the fuel provided to the engine via a fuel pump configured to deliver the fuel to a fuel rail. Fuel injection to one or more engine cylinders may be controlled via one or more fuel injectors. A presence or an absence of a potential vehicle stall condition during propelling the vehicle at least in part by the engine may be indicated. Fuel injection to the one or more engine cylinders may be shut off based on vehicle operating conditions. Pressure in the fuel rail may be monitored via a fuel rail pressure sensor while fuel injection to the one or more engine cylinders is shut off. In such an example, in a first condition, including an absence of an indicated potential stall condition, a controller may control an amount of power supplied to the fuel pump while fuel injection is shut off, based on the monitored pressure in the fuel rail. In a second condition, including a presence of the indicated potential stall condition, a controller may control the amount of power supplied to the fuel pump while fuel injection is shut off, independent of pressure in the fuel rail.

Controlling the amount of power supplied to the fuel pump in the first condition may include controlling a fuel pump duty cycle to increase pressure in the fuel rail to above the predetermined fuel rail pressure threshold. Controlling the amount of power supplied to the fuel pump in the second condition may include controlling a fuel pump speed to a minimum fuel pump duty cycle, where the minimum fuel pump duty cycle comprises a lowest amount of power provided to the fuel pump that maintains fuel flowing across the fuel pump. Furthermore, shutting off fuel injection to the one or more engine cylinders based on vehicle operating conditions in both the first condition and the second condition may include either a deceleration fuel shut off event where the engine continues to spin without fuel injection, or an idle stop event where the engine spins to rest without fuel injection.

Turning now to FIG. 6, an example timeline 600 is shown for determining whether potential stall conditions are present during vehicle operation, and if so, controlling a vehicle fuel pump at fuel shut-off events, according to the methods described herein and with reference to FIGS. 4-5, and as applied to the systems described herein and with reference to FIGS. 1-3. Timeline 600 includes plot 605, indicating whether a vehicle is in operation (On), or not (Off), over time. Timeline 600 further includes plot 610, indicating whether an engine of the vehicle is in operation (On), or not (Off), over time. As an example, a hybrid electric vehicle, or a S/S vehicle, may in some examples be in operation (On), but where the engine is off. Timeline 600 further includes plot 615, indicating whether a potential stall condition is indicated, over time. Timeline 600 further includes plot 620, indicating whether engine cylinder misfire events are detected during engine operation, over time. Timeline 600 further includes plot 625, indicating vehicle altitude, over time. For example, a vehicle may travel from a lower altitude, to a higher altitude, or vice versa. Line 626 represents a predetermined altitude, where, if a vehicle is above the predetermined altitude 626 for a predetermined amount of time, a potential stall condition may be indicated in some examples.

Timeline 600 further includes plot 630, indicating temperature of fuel in a vehicle fuel tank, over time. Line 631 represents a fuel temperature threshold, above which potential stall conditions may be indicated, in some examples. Timeline 600 further includes plot 635, indicating vehicle speed, over time. For example a vehicle may be stopped, or may increase (+) or decrease its speed relative to being stopped. Line 636 represents a threshold vehicle speed where the vehicle may be indicated to be stopped. Timeline 600 further includes plot 640, indicating pressure in a vehicle fuel rail (e.g. 302), as monitored via a fuel rail pressure sensor (e.g. 303), over time. Line 641 represents a fuel rail pressure threshold, where, if stall conditions are not indicated and a DFSO event is in progress, power to the fuel pump (e.g. 304) may be controlled (e.g. maintained) further responsive to monitored pressure in the fuel rail below the fuel rail pressure threshold. Timeline 600 further includes plot 645, indicating whether conditions are met for an idle stop event, over time. Timeline 600 further includes plot 650, indicating whether conditions are met for a DFSO event, over time. Timeline 600 further includes plot 655, indicating a fuel pump duty cycle, over time. For example, the fuel pump duty cycle may comprise a duty cycle between 0% (off), and 100% (fully on). Line 656 represents a minimum duty cycle, where the minimum duty cycle may comprise a duty cycle sufficient for maintaining fuel flow across the fuel pump during fuel shut-off events, for example.

At time t0, the vehicle is in operation, indicated by plot 605. Furthermore, the engine is in operation, indicated by plot 610. For example, the vehicle may be being propelled mainly by power derived by combustion of fuel via the engine. A potential stall condition is not indicated, illustrated by plot 615, and as such, misfire evens are not detected, indicated by plot 620. The vehicle is traveling at an elevation substantially lower than the predetermined altitude, where the predetermined altitude is represented by line 626 and the vehicle altitude is indicated by plot 625. Furthermore, fuel temperature, indicated by plot 630, is below the predetermined fuel temperature threshold. The vehicle is traveling at a vehicle speed substantially above a stopped condition, indicated by plot 635. The fuel pump is being duty cycled at a rate near 60% of maximum (e.g. 100%), indicated by plot 655. As such, pressure in the fuel rail, illustrated by plot 640, is indicated to be above the fuel rail pressure threshold, represented by line 641. Conditions for an idle stop event are not indicated, illustrated by plot 645, and conditions for a DFSO event are not indicated, represented by plot 650.

Between time t0 and t1, the vehicle travels at a relatively constant speed, and maintains operation at a relatively constant altitude. Temperature in the fuel tank rises, and crosses the fuel temperature threshold. However, potential vehicle stall conditions are not yet indicated to be met, as the vehicle is traveling at an altitude substantially below the predetermined altitude, and furthermore because a rate of change in altitude (e.g. rate of change in barometric pressure) is below a barometric pressure change threshold (not shown), as the vehicle altitude is indicated to be relatively constant. Furthermore, misfire events are not indicated between time t0 and t1.

However, at time t1, the vehicle begins an ascent, indicated by plot 625. As the vehicle ascends in altitude between time t1 and t2, the fuel pump duty cycle increases to keep up with engine demand. Between time t1 and t2, vehicle altitude is indicated to cross the predetermined altitude, represented by line 626. Furthermore, as the vehicle ascends between time t1 and t2, misfire events are indicated, illustrated by plot 620. As discussed above, an engine controller (e.g. 212) may monitor a misfire history of one or more engine cylinders, during selected vehicle operating conditions. Select operation conditions may include fuel temperature above the predetermined fuel temperature threshold, a rate of change in barometric pressure greater than a predetermined barometric pressure change threshold, an indication that the vehicle has been operating above the predetermined altitude, for a predetermined amount of time, etc. Because, during time t1 to t2, multiple misfire events (e.g. >2) are indicated, and because vehicle altitude is above the predetermined altitude, and further because fuel temperature is above the fuel temperature threshold, potential stall conditions are indicated at time t2, as illustrated by plot 615.

It may be understood that in the above discussion with regard to FIG. 4, potential stall conditions may further include an indication of a loss of engine torque, and deviations in expected air/fuel ratio. While not explicitly illustrated in this example timeline 600, it may be understood that between time t1 and t2, torque loss may additionally or alternatively be indicated, and deviations in expected air/fuel ratio may additionally or alternatively be indicated. However, for brevity, such indications are not included in example timeline 600.

At time t2, where the vehicle controller has indicated that potential stall conditions are present, conditions are also indicated to be met for a DFSO event. As discussed, conditions being meet for a DFSO event may be based on vehicle and engine operating conditions. In this example, it may be understood that DFSO conditions are met due to the vehicle operator releasing an accelerator pedal, such that engine load is below a threshold. It may be further understood that the act of releasing the accelerator pedal may be in response to the vehicle approaching a downhill descent.

With DFSO conditions being met at time t2, and because potential stall conditions are indicated, the engine is indicated to be commanded to an off state, at time t2. More specifically, the fuel injectors (e.g. 266) may be commanded by the vehicle controller to stop injection of fuel to the engine cylinders. However, because potential stall conditions are indicated, the fuel pump is not commanded off (e.g. power to the fuel pump is not cut off). Importantly, the fuel pump is not commanded off even though pressure in the fuel rail, as indicated by plot 640, is above the predetermined fuel rail pressure threshold, represented by line 641. Furthermore, power to the fuel pump is not maintained in its current level, or amount, responsive to the indication of DFSO conditions being met. In other words, power to the fuel pump is not maintained at the level prior to the DFSO conditions being met. Instead, responsive to the indication that DFSO conditions are met, and further responsive to the indication of potential stall conditions, the fuel pump is maintained on at a minimum (min) duty cycle, represented by line 656, where the minimum duty cycle represents a duty cycle that may maintain sufficient flow of fuel across the fuel pump during the DFSO event such that the fuel pump does not become starved for fuel, and such that fuel pump cavitation does not result. As such, between time t2 and t3, while the vehicle descends, the engine is maintained off (e.g. fuel injectors are commanded off), and the fuel pump is maintained on at the minimum duty cycle.

At time t3, conditions are no longer indicated to be met for a DFSO event. For example, as discussed above, DFSO conditions may be no longer indicated to be met responsive to the vehicle operator pressing the accelerator pedal. With DFSO conditions no longer indicated to be met, the engine may be activated (e.g. turned on), via the controller sending a signal to the fuel injectors to resume injection of fuel to the engine cylinders. Furthermore, the fuel pump duty cycle may be increased to match engine demand, indicated by plot 655.

Between time t3 and t4, vehicle speed is indicated to increase. A single misfire event, indicated by plot 620, is indicated. Because fuel temperature is indicated to be above the fuel temperature threshold, because vehicle altitude is indicated to be above the predetermined altitude, and because the misfire counter has been updated to include another misfire event, potential stall conditions are still indicated, illustrated by plot 615.

At time t4, the vehicle begins a reduction in vehicle speed. Between time t4 and t5, vehicle speed is rapidly reduced to a stop condition, indicated by plot 635. Thus, it may be understood that the vehicle operator depressed the brake pedal to rapidly bring the vehicle to a stop. As discussed above with regard to FIGS. 4-5, sensors responsive to engine speed, brake pedal position, and accelerator pedal position may be used to determine idle stop conditions. Because the brake was applied to bring the vehicle to a halt, at time t5, it is indicated that idle stop conditions are met. With idle stop conditions being met at time t5, the engine is deactivated. In other words, fueling of the engine cylinders via the fuel injectors, is stopped, via the controller commanding the fuel injectors to an off configuration. However, because potential stall conditions are indicated, the fuel pump is not commanded off (e.g. power to the fuel pump is not cut off), even though fuel rail pressure is above the fuel rail pressure threshold. Furthermore, power to the fuel pump is not maintained at the level it was operating at prior to the indication that idle stop conditions are met. Instead, responsive to the indication that idle stop conditions are met, and further responsive to the indication of potential stall conditions, the fuel pump is maintained on at a minimum (min) duty cycle, where the minimum duty cycle represents a duty cycle that may maintain sufficient flow of fuel across the fuel pump during the idle stop event, such that the fuel pump does not become starved for fuel, and such that fuel pump cavitation does not result. Thus, between time t5 and t6, while the vehicle is stopped and idle stop conditions are met, fueling of the engine is maintained off, indicated by plot 610, while the fuel pump is maintained activated at a minimum duty cycle to maintain flow of fuel across the fuel pump.

At time t6, conditions for the idle stop event are no longer indicated to be met. As discussed above, conditions for an idle stop no longer being met may include a request via the vehicle operator for engine operation. Such a request may be achieved by the vehicle operator releasing the brake pedal, for example. By releasing the brake pedal, a restart of the engine may be accomplished by the vehicle controller commanding the fuel injectors to commence injection of fuel to the engine cylinders. Furthermore, because during the idle stop, the engine is not maintained spinning (in contrast to a DFSO event), restarting the engine may be accomplished by a motor generator, or a dedicated starter motor. Furthermore, because the fuel pump was maintained on at the minimum duty cycle sufficient to keep fuel flowing across the fuel pump, the fuel pump may be maintained on during the engine startup, and the duty cycle may be increased responsive to increased engine demand. Thus after time t6, with the engine restarted, the fuel pump duty cycle is indicated to increase, responsive to engine demand.

In this way, responsive to conditions of combustion instability, or potential vehicle stall conditions, in a drive cycle just prior to a DFSO or idle stop event, power to a fuel pump that supplies fuel from a fuel tank to a fuel rail may be maintained, independent of whether pressure in the fuel rail as monitored by a fuel rail pressure sensor, is above or below a predetermined fuel rail pressure threshold. In some examples, combustion instability, or potential vehicle stall conditions may include one of at least indications of engine misfire, loss of engine torque, and disturbances to exhaust air-fuel ratio. Conditions leading to potential vehicle stall conditions may include one or more of at least a barometric pressure change rate greater than a barometric pressure change rate threshold, an indication that the vehicle has been traveling above a predetermined altitude for a predetermined amount of time, and an indication of fuel temperature above a fuel temperature threshold. In this way, fuel may be kept flowing across the fuel pump under conditions where fuel pump cavitation may occur responsive to power to the fuel pump being cut off during DFSO or idle stop events.

The technical effect is to recognize that power to the fuel pump may be maintained at a minimum fuel pump speed during DFSO or idle stop events, responsive to indicated combustion instability (e.g. potential stall conditions) in a drive cycle comprising a time period between a key-on event and the DFSO or idle stop event. Power to the fuel pump may be maintained under such circumstances, regardless of whether pressure in the fuel rail is above, or below, a predetermined fuel rail pressure threshold. By operating the fuel pump at a minimum fuel pump speed, where the minimum fuel pump speed may comprise a speed at which fuel is kept flowing across the fuel pump, but where minimal battery power is utilized, fuel pump cavitation may be prevented, and engine and fuel pump complications resulting from the combustion stability issues, may be avoided.

In another representation, a method may include, responsive to a deceleration fuel shut off (DFSO) event, while the engine continues to spin without fuel injection to the one or more cylinders, maintaining power to the fuel pump responsive to fuel rail pressure below a fuel rail pressure threshold at a time when fuel injection is stopped; and responsive to an engine idle stop, where the engine spins down to rest, maintaining power to the fuel pump responsive to an indication of combustion instability before the idle stop, even if fuel rail pressure is above the fuel rail pressure threshold. In addition, various additional operations can be included as described herein.

The systems described herein, and with reference to FIGS. 1-3, along with the methods described herein and with reference to FIGS. 4-5, may enable one or more systems and one or more methods. In one example, a method comprises propelling a vehicle at least in part by an engine that combusts fuel provided to the engine via a fuel pump; controlling fuel injection to one or more engine cylinders via one or more fuel injectors; monitoring the engine for a potential stall condition while the engine is combusting fuel; and controlling the fuel pump at a fuel shut-off event based on whether the potential stall condition is indicated. In a first example of the method, the method further comprises monitoring acceleration of a crankshaft coupled to one or more pistons of the engine via a crankshaft sensor; and wherein the potential stall condition includes one of at least multiple misfire events, and loss of engine torque, where misfire events and loss of engine torque are indicated via the crankshaft sensor. A second example of the method optionally includes the first example, and further comprises routing exhaust gas generated by the engine combusting fuel to an exhaust manifold; indicating an exhaust gas air/fuel ratio via an exhaust gas oxygen sensor; and wherein the potential stall condition includes an indication of a disturbance to the exhaust gas air/fuel ratio. A third example of the method optionally includes any one or more or each of the first and second examples, and further includes wherein the potential stall condition further comprises: indicating one of at least a barometric pressure change rate greater than a predetermined barometric pressure change rate threshold, or indicating that the vehicle has been operating above a predetermined altitude for a predetermined amount of time; wherein barometric pressure or altitude is indicated via one of at least a pressure sensor positioned in an air intake manifold of the engine, an onboard navigation system, and wireless communication via the internet. A fourth example of the method optionally includes any one or more or each of the first through third examples and further includes wherein the potential stall condition further comprises: indicating whether temperature of the fuel provided to the engine is above a predetermined fuel temperature threshold; wherein fuel temperature is indicated via one of at least a fuel tank temperature sensor positioned in a fuel tank, and an indication of air mass consumed by the engine during a drive cycle. A fifth example of the method optionally includes any one or more or each of the first through fourth examples and further includes wherein the fuel shut-off event further comprises: stopping fuel injection to the one or more engine cylinders by commanding the one or more fuel injectors to stop injection of fuel. A sixth example of the method optionally includes any one or more or each of the first through fifth examples and further comprises monitoring pressure in a fuel rail responsive to the fuel shut-off event, where the fuel pump is configured to provide pressurized fuel to the fuel rail prior to the fuel being delivered to the one or more fuel injectors; and wherein controlling the fuel pump at the fuel shut-off event based on whether the potential stall condition is indicated includes: stopping the fuel pump responsive to pressure in the fuel rail above a predetermined fuel rail pressure threshold, and further responsive to the potential stall condition not being indicated. A seventh example of the method optionally includes any one or more or each of the first through sixth examples and further includes wherein controlling the fuel pump at the fuel shut-off event based on whether the potential stall condition is indicated further comprises: maintaining power to the fuel pump responsive to pressure in the fuel rail below the predetermined fuel rail pressure threshold, and further responsive to the potential stall condition not being indicated. An eighth example of the method optionally includes any one or more or each of the first through seventh examples and further includes wherein maintaining power to the fuel pump includes controlling a fuel pump speed; wherein the fuel pump speed is controlled as a function of indicated pressure in the fuel rail; and wherein the fuel pump is stopped responsive to pressure in the fuel rail reaching the predetermined fuel rail pressure threshold during the fuel shut-off event. A ninth example of the method optionally includes any one or more or each of the first through eighth examples and further includes wherein controlling the fuel pump at the fuel shut-off event based on whether the potential stall condition is indicated includes: maintaining power to the fuel pump responsive to the potential stall condition being indicated, and independent of pressure in the fuel rail. A tenth example of the method optionally includes any one or more or each of the first through ninth examples and further includes wherein maintaining power to the fuel pump includes controlling fuel pump speed to a minimum speed, where the minimum speed comprises a lowest amount of power provided to the pump that maintains fuel flowing across the fuel pump. An eleventh example of the method optionally includes any one or more or each of the first through tenth examples and further includes wherein the fuel shut-off event comprises an idle stop event, or a deceleration fuel shut off (DFSO) event; wherein the idle stop event includes at least depression of a brake pedal by a vehicle operator to bring the vehicle to a stop; wherein a DFSO event includes at least release of an accelerator pedal; and wherein the engine is spun down to rest during the idle stop, but wherein the engine is continued to operate without fueling during the DFSO event.

An example of a system for a vehicle comprises a fuel tank; a fuel rail; an electric fuel pump, configured to supply pressurized fuel from the fuel tank to the fuel rail; an onboard power supply, removably electrically coupled to the electric fuel pump; a combustion engine, with one or more cylinders, an intake manifold, and an exhaust manifold; one or more fuel injectors, configured to receive pressurized fuel from the fuel rail and supply fuel to the one or more cylinders; a fuel rail pressure sensor; and a controller storing instructions in non-transitory memory, that when executed, cause the controller to: responsive to a deceleration fuel shut off (DFSO) event, while the engine continues to spin without fuel injection to the one or more cylinders, maintain power to the fuel pump responsive to fuel rail pressure below a fuel rail pressure threshold at a time when fuel injection is stopped; and responsive to an engine idle stop, where the engine spins down to rest, maintain power to the fuel pump responsive to an indication of combustion instability before the idle stop, even if fuel rail pressure is above the fuel rail pressure threshold. In a first example, the system further comprises a crankshaft coupled to one or more pistons; a crankshaft sensor; an exhaust gas oxygen sensor positioned in the exhaust manifold; a mass air flow sensor positioned in the intake manifold; a manifold air pressure sensor positioned in the intake manifold; wherein the controller further stores instructions in non-transitory memory, that when executed, cause the controller to: prior to commencing the DFSO event or idle stop event; monitor acceleration of the crankshaft via the crankshaft sensor; indicate an exhaust gas air/fuel ratio via the exhaust gas oxygen sensor; indicate barometric pressure via the manifold air pressure sensor;

indicate a fuel temperature of the fuel in the fuel tank as a function of total air mass consumed by the engine during a drive cycle via the mass air flow sensor; and wherein indicating combustion instability comprises one or more of at least: multiple misfire events and loss of engine torque, where misfire events and loss of engine torque are indicated via the crankshaft sensor; a barometric pressure change rate greater than a predetermined barometric pressure change rate threshold, or an indication that the vehicle has been operating above a predetermined altitude for a predetermined amount of time; and a fuel temperature of the fuel provided to the engine above a predetermined fuel temperature threshold. A second example of the system optionally includes the first example, and further includes wherein the controller further stores instructions in non-transitory memory, that when executed, cause the controller to: indicate an absence of combustion instability in a drive cycle before the DFSO event, where the indicated absence of combustion instability and the DFSO event occur in the same drive cycle; control a fuel pump duty cycle to increase pressure in the fuel rail to above the predetermined fuel rail pressure threshold while fuel injection is stopped; and wherein responsive to an indication that the pressure in the fuel rail is above the predetermined fuel rail pressure threshold: stop power being supplied to the fuel pump. A third example of the method optionally includes any one or more or each of the first and second examples, and further includes wherein the controller further stores instructions in non-transitory memory, that when executed, cause the controller to: responsive to the engine idle stop, control a fuel pump speed to a minimum speed, where the minimum speed comprises a lowest amount of power provided to the fuel pump that maintains fuel flowing across the fuel pump. A fourth example of the method optionally includes any one or more or each of the first through third examples and further includes wherein the controller further stores instructions in non-transitory memory, that when executed, cause the controller to: maintain power to the fuel pump responsive to the DFSO event and combustion instability being indicated prior to the DFSO event, if pressure in the fuel rail is above or below the predetermined fuel rail pressure threshold; and maintain power to the fuel pump responsive to the idle stop event and combustion instability not being indicated, and responsive to pressure in the fuel rail below the predetermined fuel rail pressure threshold, but not responsive to pressure in the fuel rail above the predetermined fuel rail pressure threshold.

Another example of a method comprises propelling a vehicle at least in part by an engine that combusts fuel, the fuel provided to the engine via a fuel pump configured to deliver the fuel to a fuel rail; controlling fuel injection to one or more engine cylinders via one or more fuel injectors; indicating a presence or an absence of a potential vehicle stall condition during propelling the vehicle at least in part by the engine; shutting off fuel injection to the one or more engine cylinders based on vehicle operating conditions; monitoring pressure in the fuel rail via a fuel rail pressure sensor while fuel injection to the one or more engine cylinders is shut off; and in a first condition, including an absence of an indicated potential stall condition, controlling an amount of power supplied to the fuel pump while fuel injection is shut off, based on the monitored pressure in the fuel rail; in a second condition, including a presence of the indicated potential stall condition, controlling the amount of power supplied to the fuel pump while fuel injection is shut off, independent of pressure in the fuel rail. In a first example of the method, the method further comprises while the engine is combusting fuel during a drive cycle prior to shutting off fuel injection; monitoring acceleration of a crankshaft coupled to one or more pistons of the engine via a crankshaft sensor; routing exhaust gas generated by the engine combusting fuel to an exhaust manifold and indicating an exhaust gas air/fuel ratio via an exhaust gas oxygen sensor; indicating barometric pressure via one of at least a pressure sensor positioned in an air intake manifold of the engine, an onboard navigation system, and wireless communication via the internet; indicating a fuel temperature of the fuel provided to the engine via one of at least a fuel tank temperature sensor positioned in a fuel tank, and an indication of air mass consumed by the engine during a drive cycle; and wherein indicating the presence or the absence of a potential vehicle stall condition during propelling the vehicle at least in part by the engine further comprises one or more of at least: multiple misfire events and loss of engine torque, where misfire events and loss of engine torque are indicated via the crankshaft sensor; a barometric pressure change greater than a predetermined barometric pressure change threshold, or an indication that the vehicle has been operating above a predetermined altitude for a predetermined amount of time; and a fuel temperature of the fuel provided to the engine above a predetermined fuel temperature threshold. A second example of the method optionally includes the first example, and further includes wherein controlling the amount of power supplied to the fuel pump in the first condition includes controlling a fuel pump duty cycle to increase pressure in the fuel rail to above the predetermined fuel rail pressure threshold; wherein controlling the amount of power supplied to the fuel pump in the second condition includes controlling a fuel pump speed to a minimum fuel pump duty cycle, where the minimum fuel pump duty cycle comprises a lowest amount of power provided to the fuel pump that maintains fuel flowing across the fuel pump; and wherein shutting off fuel injection to the one or more engine cylinders based on vehicle operating conditions in both the first condition and the second condition includes either a deceleration fuel shut off event where the engine continues to spin without fuel injection, or an idle stop event where the engine spins to rest without fuel injection.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
propelling a vehicle at least in part by an engine that combusts fuel provided to the engine via a fuel pump;
controlling fuel injection to one or more engine cylinders via one or more fuel injectors;
monitoring the engine for a potential stall condition while the engine is combusting fuel; and
controlling the fuel pump at a fuel shut-off event based on whether the potential stall condition is indicated, where controlling the fuel pump includes stopping the fuel pump responsive to a pressure in a fuel rail above a predetermined fuel rail pressure threshold and further responsive to the potential stall condition not being indicated, the pressure in the fuel rail monitored responsive to the fuel shut-off event and where the fuel pump is configured to provide pressurized fuel to the fuel rail prior to the fuel being delivered to the one or more fuel injectors.

2. The method of claim 1, further comprising:
monitoring acceleration of a crankshaft coupled to one or more pistons of the engine via a crankshaft sensor; and
wherein the potential stall condition includes one of at least multiple misfire events, and loss of engine torque, where misfire events and loss of engine torque are indicated via the crankshaft sensor.

3. The method of claim 1, further comprising:
routing exhaust gas generated by the engine combusting fuel to an exhaust manifold;
indicating an exhaust gas air/fuel ratio via an exhaust gas oxygen sensor; and
wherein the potential stall condition includes an indication of a disturbance to the exhaust gas air/fuel ratio.

4. The method of claim 1, wherein the potential stall condition further comprises:
indicating one of at least a barometric pressure change rate greater than a predetermined barometric pressure change rate threshold, or indicating that the vehicle has been operating above a predetermined altitude for a predetermined amount of time;
wherein barometric pressure or altitude is indicated via one of at least a pressure sensor positioned in an air intake manifold of the engine, an onboard navigation system, and wireless communication via the internet.

5. The method of claim 1, wherein the potential stall condition further comprises:
indicating whether temperature of the fuel provided to the engine is above a predetermined fuel temperature threshold;
wherein fuel temperature is indicated via one of at least a fuel tank temperature sensor positioned in a fuel tank, and an indication of air mass consumed by the engine during a drive cycle.

6. The method of claim 1, wherein the fuel shut-off event further comprises:
stopping fuel injection to the one or more engine cylinders by commanding the one or more fuel injectors to stop injection of fuel.

7. The method of claim 1, wherein controlling the fuel pump at the fuel shut-off event based on whether the potential stall condition is indicated further comprises:
maintaining power to the fuel pump responsive to the pressure in the fuel rail below the predetermined fuel rail pressure threshold, and further responsive to the potential stall condition not being indicated.

8. The method of claim 7, wherein maintaining power to the fuel pump includes controlling a fuel pump speed;
wherein the fuel pump speed is controlled as a function of indicated pressure in the fuel rail; and
wherein the fuel pump is stopped responsive to the pressure in the fuel rail reaching the predetermined fuel rail pressure threshold during the fuel shut-off event.

9. The method of claim 1, wherein controlling the fuel pump at the fuel shut-off event based on whether the potential stall condition is indicated includes:
maintaining power to the fuel pump responsive to the potential stall condition being indicated, and independent of the pressure in the fuel rail.

10. The method of claim 9, wherein maintaining power to the fuel pump includes controlling fuel pump speed to a minimum speed, where the minimum speed comprises a lowest amount of power provided to the fuel pump that maintains fuel flowing across the fuel pump.

11. The method of claim 1, wherein the fuel shut-off event comprises an idle stop event, or a deceleration fuel shut off (DFSO) event;
wherein the idle stop event includes at least depression of a brake pedal by a vehicle operator to bring the vehicle to a stop;
wherein the DFSO event includes at least release of an accelerator pedal; and
wherein the engine is spun down to rest during the idle stop event, but wherein the engine continues to operate without fueling during the DFSO event.

12. A system for a vehicle, comprising:
a fuel tank;
a fuel rail;
an electric fuel pump, configured to supply pressurized fuel from the fuel tank to the fuel rail;
an onboard power supply, removably electrically coupled to the electric fuel pump;
a combustion engine, with one or more cylinders, an intake manifold, and an exhaust manifold;
one or more fuel injectors, configured to receive pressurized fuel from the fuel rail and supply fuel to the one or more cylinders;
a fuel rail pressure sensor; and a controller storing instructions in non-transitory memory, that when executed, cause the controller to:
responsive to a deceleration fuel shut off (DFSO) event, while the engine continues to spin without fuel injection to the one or more cylinders, maintain power to the fuel pump responsive to fuel rail pressure below a fuel rail pressure threshold at a time when fuel injection is stopped; and
responsive to an engine idle stop, where the engine spins down to rest, maintain power to the electric fuel pump responsive to an indication of combustion instability before the engine idle stop, even if the fuel rail pressure is above the fuel rail pressure threshold.

13. The system of claim 12, further comprising:
a crankshaft coupled to one or more pistons;
a crankshaft sensor;
an exhaust gas oxygen sensor positioned in the exhaust manifold;
a mass air flow sensor positioned in the intake manifold;
a manifold air pressure sensor positioned in the intake manifold;
wherein the controller further stores instructions in non-transitory memory, that when executed, cause the controller to:
prior to commencing the DFSO event or the engine idle stop;
monitor acceleration of the crankshaft via the crankshaft sensor;
indicate an exhaust gas air/fuel ratio via the exhaust gas oxygen sensor;
indicate barometric pressure via the manifold air pressure sensor;
indicate a fuel temperature of fuel in the fuel tank as a function of total air mass consumed by the engine during a drive cycle via the mass air flow sensor; and
wherein indicating combustion instability comprises one or more of at least:
multiple misfire events and loss of engine torque, where misfire events and loss of engine torque are indicated via the crankshaft sensor;
a barometric pressure change rate greater than a predetermined barometric pressure change rate threshold, or an indication that the vehicle has been operating above a predetermined altitude for a predetermined amount of time; and
the fuel temperature of the fuel provided to the engine above a predetermined fuel temperature threshold.

14. The system of claim 12, wherein the controller further stores instructions in non-transitory memory, that when executed, cause the controller to:
indicate an absence of combustion instability in a drive cycle before the DFSO event, where the indicated absence of combustion instability and the DFSO event occur in the same drive cycle;
control a fuel pump duty cycle to increase the fuel rail pressure in the fuel rail to above the predetermined fuel rail pressure threshold while fuel injection is stopped; and
wherein responsive to an indication that the fuel rail pressure in the fuel rail is above the predetermined fuel rail pressure threshold:
stop power being supplied to the fuel pump.

15. The system of claim 12, wherein the controller further stores instructions in non-transitory memory, that when executed, cause the controller to:
responsive to the engine idle stop, control a fuel pump speed to a minimum speed, where the minimum speed comprises a lowest amount of power provided to the fuel pump that maintains fuel flowing across the fuel pump.

16. The system of claim 12, wherein the controller further stores instructions in non-transitory memory, that when executed, cause the controller to:
maintain power to the fuel pump responsive to the DFSO event and combustion instability being indicated prior to the DFSO event, if the fuel rail pressure is above or below the predetermined fuel rail pressure threshold; and
maintain power to the fuel pump responsive to the engine idle stop and combustion instability not being indicated, and responsive to the fuel rail pressure below the predetermined fuel rail pressure threshold, but not responsive to the fuel rail pressure above the predetermined fuel rail pressure threshold.

17. A method, comprising:
propelling a vehicle at least in part by an engine that combusts fuel, the fuel provided to the engine via a fuel pump configured to deliver the fuel to a fuel rail;
controlling fuel injection to one or more engine cylinders via one or more fuel injectors;
indicating a presence or an absence of a potential vehicle stall condition during propelling the vehicle at least in part by the engine;
shutting off fuel injection to the one or more engine cylinders based on vehicle operating conditions;
monitoring a pressure in the fuel rail via a fuel rail pressure sensor while fuel injection to the one or more engine cylinders is shut off; and
in a first condition, including the absence of the indicated potential stall condition, controlling an amount of power supplied to the fuel pump while fuel injection is shut off, based on the monitored pressure in the fuel rail;
in a second condition, including the presence of the indicated potential stall condition, controlling the amount of power supplied to the fuel pump while fuel injection is shut off, independent of the pressure in the fuel rail.

18. The method of claim 17, further comprising:
while the engine is combusting fuel during a drive cycle prior to shutting off fuel injection;
monitoring acceleration of a crankshaft coupled to one or more pistons of the engine via a crankshaft sensor;
routing exhaust gas generated by the engine combusting fuel to an exhaust manifold and indicating an exhaust gas air/fuel ratio via an exhaust gas oxygen sensor;
indicating barometric pressure via one of at least a pressure sensor positioned in an air intake manifold of the engine, an onboard navigation system, and wireless communication via the internet;
indicating a fuel temperature of the fuel provided to the engine via one of at least a fuel tank temperature sensor positioned in a fuel tank, and an indication of air mass consumed by the engine during the drive cycle; and
wherein indicating the presence or the absence of a potential vehicle stall condition during propelling the vehicle at least in part by the engine further comprises one or more of at least:
multiple misfire events and loss of engine torque, where misfire events and loss of engine torque are indicated via the crankshaft sensor;
a barometric pressure change greater than a predetermined barometric pressure change threshold, or an indication that the vehicle has been operating above a predetermined altitude for a predetermined amount of time; and the fuel temperature of the fuel provided to the engine above a predetermined fuel temperature threshold.

19. The method of claim 17, wherein controlling the amount of power supplied to the fuel pump in the first condition includes controlling a fuel pump duty cycle to increase the pressure in the fuel rail to above a predetermined fuel rail pressure threshold;

wherein controlling the amount of power supplied to the fuel pump in the second condition includes controlling a fuel pump speed to a minimum fuel pump duty cycle, where the minimum fuel pump duty cycle comprises a lowest amount of power provided to the fuel pump that maintains fuel flowing across the fuel pump; and wherein shutting off fuel injection to the one or more engine cylinders based on vehicle operating conditions in both the first condition and the second condition includes either a deceleration fuel shut off event where the engine continues to spin without fuel injection, or an idle stop event where the engine spins to rest without fuel injection.

* * * * *